(12) United States Patent
Pu et al.

(10) Patent No.: US 12,472,129 B2
(45) Date of Patent: Nov. 18, 2025

(54) FOAMING MIXED ALCOHOL/WATER COMPOSITIONS COMPRISING A STRUCTURED ALKOXYLATED SILOXANE

(71) Applicant: ECOLAB USA INC., Saint Paul, MN (US)

(72) Inventors: Gang Pu, Saint Paul, MN (US); Victor Fuk-Pong Man, Saint Paul, MN (US); Derrick Richard Anderson, Saint Paul, MN (US); Hilina Emiru, Saint Paul, MN (US); Timothy McGinnis, St. Paul, MN (US); Frederick J. Swiecinski, St. Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 236 days.

(21) Appl. No.: 17/305,357

(22) Filed: Jul. 6, 2021

(65) Prior Publication Data

US 2022/0000726 A1 Jan. 6, 2022

Related U.S. Application Data

(60) Provisional application No. 62/705,589, filed on Jul. 6, 2020.

(51) Int. Cl.

| *A61K 8/04* | (2006.01) |
| *A01N 25/16* | (2006.01) |
| *A01N 25/30* | (2006.01) |
| *A01P 1/00* | (2006.01) |
| *A61K 8/34* | (2006.01) |
| *A61K 8/894* | (2006.01) |
| *A61Q 17/00* | (2006.01) |
| *A61Q 19/00* | (2006.01) |
| *A61Q 19/10* | (2006.01) |

(52) U.S. Cl.
CPC .............. *A61K 8/046* (2013.01); *A01P 1/00* (2021.08); *A61K 8/34* (2013.01); *A61K 8/894* (2013.01); *A61Q 17/005* (2013.01); *A61Q 19/007* (2013.01); *A61Q 19/10* (2013.01); *A01N 25/16* (2013.01); *A01N 25/30* (2013.01); *A61K 2800/5426* (2013.01); *A61K 2800/594* (2013.01); *A61K 2800/596* (2013.01)

(58) Field of Classification Search
None
See application file for complete search history.

(56) References Cited

U.S. PATENT DOCUMENTS

| 2,096,837 A | 10/1937 | Baker |
| 2,198,354 A | 4/1940 | Tjaarda |
| 2,301,989 A | 11/1942 | Zamborsky |
| 2,367,719 A | 1/1945 | Gallay |
| 2,396,742 A | 3/1946 | Milliken |
| 2,410,796 A | 11/1946 | Newbery et al. |
| 2,436,414 A | 2/1948 | Arnemo |
| 2,444,870 A | 7/1948 | Clifford |
| 2,472,564 A | 6/1949 | Britten, Jr. |
| 2,487,270 A | 11/1949 | Peterson et al. |
| 2,516,816 A | 7/1950 | Wagner et al. |
| 2,523,207 A | 9/1950 | Fowler et al. |
| 2,533,950 A | 12/1950 | McCormick |
| 2,539,987 A | 1/1951 | Burger |
| 2,562,329 A | 7/1951 | O'Brien |
| 2,572,107 A | 10/1951 | Butin |
| 2,595,025 A | 4/1952 | Tripplehorn |
| 2,596,994 A | 5/1952 | Haberland |
| 2,600,854 A | 6/1952 | Cross |
| 2,647,311 A | 8/1953 | Arden |
| 3,787,566 A | 1/1974 | Gauvreau |
| 4,096,240 A | 6/1978 | Mathur |
| 4,220,665 A | 9/1980 | Klein |
| 4,258,052 A | 3/1981 | Yu et al. |
| 4,336,151 A | 6/1982 | Like et al. |
| 4,511,486 A | 4/1985 | Shah |
| 4,714,568 A | 12/1987 | Hurnik et al. |
| 4,725,609 A | 2/1988 | Kull, Jr. et al. |
| 4,758,599 A | 7/1988 | Minetti |
| 4,857,302 A | 8/1989 | Decker, Jr. et al. |
| 5,015,228 A | 5/1991 | Columbus et al. |
| 5,047,249 A | 9/1991 | Rothman et al. |

(Continued)

FOREIGN PATENT DOCUMENTS

| BR | 102016000880 A2 | 7/2017 |
| DE | 19523320 A1 | 1/1997 |

(Continued)

OTHER PUBLICATIONS

Technical Data Sheet for Silsurf®Di-2012 obtained from the website: https://www.siltech.com/wp-content/uploads/2017/10/TP2841.pdf.*

Siltech product brochure obtained from the website: http://www.scientificspectator.com/documents/silicone%20spectator/Siltech%20Main%20Brochure%20.pdf.*

International Searching Authority in connection with PCT/US2021/040531 filed Jul. 6, 2021, "The International Search Report and the Written Opinion of the International Searching Authority, or the Declaration", 11 pages, mailed Oct. 19, 2021.

(Continued)

*Primary Examiner* — Sin J Lee

(74) *Attorney, Agent, or Firm* — McKee, Voorhees & Sease, PLC

(57) ABSTRACT

The disclosure includes structured siloxanes which can foam in low surface tension solutions. The foaming compositions may form foam in alcohol/water and hydrocarbon condensates. The foaming compositions may replace surfactants in other compositions. The disclosure also includes sterilizing alcohol compositions, cleaning compositions, such as hard surface cleaners, warewash detergents, rinse aids, hand sanitizers, and the like which incorporate the same.

26 Claims, 1 Drawing Sheet

(56) References Cited

U.S. PATENT DOCUMENTS

| | | |
|---|---|---|
| 5,073,371 A | 12/1991 | Turner et al. |
| 5,167,950 A | 12/1992 | Lins |
| D338,585 S | 8/1993 | Bell et al. |
| 5,250,290 A | 10/1993 | Giacomoni et al. |
| 5,254,331 A | 10/1993 | Mausner |
| 5,256,401 A | 10/1993 | Duckenfield et al. |
| 5,265,772 A | 11/1993 | Bartasevich et al. |
| 5,266,598 A | 11/1993 | Ninomiya et al. |
| D343,751 S | 2/1994 | Bell et al. |
| D346,332 S | 4/1994 | Kanfer et al. |
| 5,336,497 A | 8/1994 | Guerrero et al. |
| 5,370,267 A | 12/1994 | Schroeder |
| 5,441,178 A | 8/1995 | Wysocki |
| 5,443,236 A | 8/1995 | Bell et al. |
| 5,449,137 A | 9/1995 | Bell et al. |
| 5,462,688 A | 10/1995 | Lippman et al. |
| D365,509 S | 12/1995 | Bell et al. |
| D365,518 S | 12/1995 | Wysocki |
| D365,755 S | 1/1996 | Kanfer et al. |
| 5,523,014 A | 6/1996 | Dolan et al. |
| 5,558,453 A | 9/1996 | Bell et al. |
| 5,587,358 A | 12/1996 | Sukigara et al. |
| 5,625,659 A | 4/1997 | Sears |
| 5,629,006 A | 5/1997 | Hoang et al. |
| 5,635,462 A | 6/1997 | Fendler et al. |
| D383,001 S | 9/1997 | Bell et al. |
| D385,795 S | 11/1997 | Wysocki et al. |
| 5,718,353 A | 2/1998 | Kanfer et al. |
| 5,719,113 A | 2/1998 | Fendler et al. |
| D392,136 S | 3/1998 | Ross et al. |
| 5,725,131 A | 3/1998 | Bell et al. |
| D400,799 S | 11/1998 | Bell et al. |
| 5,833,998 A | 11/1998 | Biedermann et al. |
| 5,853,700 A | 12/1998 | Gormley et al. |
| 5,880,088 A * | 3/1999 | Lentsch .............. C11D 11/0035 510/423 |
| 5,902,778 A | 5/1999 | Hartmann et al. |
| D411,456 S | 6/1999 | Mast et al. |
| 5,939,082 A | 8/1999 | Oblong et al. |
| 5,944,227 A | 8/1999 | Schroeder et al. |
| D415,343 S | 10/1999 | Maddox |
| 5,962,482 A | 10/1999 | Bissett |
| 5,968,528 A | 10/1999 | Deckner et al. |
| 5,972,356 A | 10/1999 | Peffly et al. |
| D416,417 S | 11/1999 | Ross et al. |
| 5,980,921 A | 11/1999 | Biedermann et al. |
| 5,989,523 A | 11/1999 | Fitzjarrell |
| 5,996,851 A | 12/1999 | Dolan et al. |
| 5,997,887 A | 12/1999 | Ha et al. |
| 5,997,890 A | 12/1999 | Sine et al. |
| D418,708 S | 1/2000 | Kanfer et al. |
| 6,022,551 A | 2/2000 | Jampani et al. |
| 6,024,942 A | 2/2000 | Tanner et al. |
| D422,828 S | 4/2000 | Kanfer et al. |
| 6,046,152 A | 4/2000 | Vinson et al. |
| 6,065,639 A | 5/2000 | Maddox et al. |
| 6,087,309 A | 7/2000 | Vinson et al. |
| 6,090,395 A | 7/2000 | Asmus et al. |
| 6,130,253 A | 10/2000 | Franklin et al. |
| 6,149,925 A | 11/2000 | Mammone et al. |
| 6,183,766 B1 | 2/2001 | Sine et al. |
| 6,217,885 B1 | 4/2001 | Röder et al. |
| 6,224,888 B1 | 5/2001 | Vatter et al. |
| 6,239,093 B1 | 5/2001 | Foley et al. |
| 6,265,363 B1 | 7/2001 | Viscovitz |
| 6,267,976 B1 | 7/2001 | Barnhart et al. |
| 6,274,124 B1 | 8/2001 | Vollhardt |
| 6,309,657 B2 | 10/2001 | Vatter et al. |
| 6,319,958 B1 | 11/2001 | Johnson et al. |
| 6,333,039 B1 | 12/2001 | Fendler et al. |
| 6,344,218 B1 | 2/2002 | Dodd et al. |
| 6,352,701 B1 | 3/2002 | Scholz et al. |
| 6,383,505 B1 | 5/2002 | Kaiser et al. |
| 6,383,997 B1 | 5/2002 | McManus |
| 6,407,051 B1 | 6/2002 | Smith et al. |
| 6,423,329 B1 | 7/2002 | Sine et al. |
| 6,432,430 B1 | 8/2002 | Fitzjarrell |
| 6,462,010 B1 | 10/2002 | Aszman et al. |
| 6,528,070 B1 | 3/2003 | Bratescu et al. |
| 6,534,069 B1 | 3/2003 | Asmus et al. |
| 6,592,880 B1 | 7/2003 | Jager |
| 6,607,737 B2 | 8/2003 | Bekele et al. |
| 6,613,341 B2 | 9/2003 | Motley et al. |
| 6,623,744 B2 | 9/2003 | Asmus et al. |
| 6,689,593 B2 | 2/2004 | Millis et al. |
| 6,706,679 B1 | 3/2004 | Bergeron et al. |
| 6,709,647 B2 | 3/2004 | Bhakoo et al. |
| 6,723,689 B1 | 4/2004 | Hoang et al. |
| 6,846,846 B2 | 1/2005 | Modak et al. |
| 6,903,064 B1 | 6/2005 | Kasturi et al. |
| 6,939,552 B2 | 9/2005 | Ansara et al. |
| 6,977,082 B2 | 12/2005 | Seitz, Jr. et al. |
| 6,979,468 B1 | 12/2005 | Pollard |
| 7,081,246 B2 | 7/2006 | Asmus et al. |
| 7,166,435 B2 | 1/2007 | Rosenbloom |
| 7,199,090 B2 | 4/2007 | Koivisto et al. |
| 7,465,697 B1 | 12/2008 | DeAth |
| 7,560,422 B2 | 7/2009 | Shapiro |
| 7,569,530 B1 | 8/2009 | Pan et al. |
| 7,612,115 B2 | 11/2009 | Suzuki et al. |
| 7,651,990 B2 | 1/2010 | Asmus |
| 7,795,196 B2 | 9/2010 | Luu et al. |
| 7,803,390 B2 | 9/2010 | Asmus et al. |
| 7,842,725 B2 | 11/2010 | Wegner et al. |
| 7,914,774 B2 | 3/2011 | Meehan |
| 8,058,315 B2 | 11/2011 | Wegner et al. |
| 8,106,094 B2 | 1/2012 | Sah et al. |
| 8,119,698 B2 | 2/2012 | Polonka et al. |
| 8,263,098 B2 | 9/2012 | Fernandez de Castro et al. |
| 8,309,111 B2 | 11/2012 | Fernandez de Castro et al. |
| 8,313,758 B2 | 11/2012 | Fernandez de Castro et al. |
| 8,333,954 B2 | 12/2012 | Seidling et al. |
| 8,383,686 B2 | 2/2013 | Wegner et al. |
| 8,530,524 B2 | 9/2013 | Wegner et al. |
| 8,658,701 B2 | 2/2014 | Wegner et al. |
| 8,940,797 B2 | 1/2015 | Wegner et al. |
| 9,414,586 B2 | 8/2016 | Wegner et al. |
| 2002/0022660 A1 | 2/2002 | Jampani et al. |
| 2002/0168329 A1 | 11/2002 | Kini et al. |
| 2003/0023550 A1 | 1/2003 | Lee |
| 2003/0049212 A1 | 3/2003 | Robinson et al. |
| 2003/0147925 A1 | 8/2003 | Sawan et al. |
| 2003/0194447 A1 | 10/2003 | Scholz et al. |
| 2003/0203452 A1 | 10/2003 | Li et al. |
| 2003/0211066 A1 | 11/2003 | Scholz et al. |
| 2003/0215418 A1 | 11/2003 | Asmus et al. |
| 2004/0001797 A1 | 1/2004 | Saud et al. |
| 2004/0102429 A1 | 5/2004 | Modak et al. |
| 2004/0191274 A1 | 9/2004 | Grayson et al. |
| 2004/0247685 A1 | 12/2004 | Modak et al. |
| 2005/0053593 A1 | 3/2005 | Wang et al. |
| 2005/0058673 A1 | 3/2005 | Scholz et al. |
| 2005/0089539 A1 | 4/2005 | Scholz et al. |
| 2005/0102266 A1 | 5/2005 | Nason et al. |
| 2005/0142079 A1 | 6/2005 | Garrison et al. |
| 2005/0148059 A1 | 7/2005 | Estell et al. |
| 2006/0014750 A1 | 1/2006 | O'Donnell et al. |
| 2006/0035807 A1 | 2/2006 | Kasturi et al. |
| 2006/0051384 A1 | 3/2006 | Scholz et al. |
| 2006/0062832 A1 | 3/2006 | Lopes |
| 2006/0094387 A1 | 5/2006 | Darabi |
| 2006/0104911 A1 | 5/2006 | Novak |
| 2006/0104919 A1 | 5/2006 | Novak |
| 2006/0177511 A1 | 8/2006 | Scholz et al. |
| 2006/0182690 A1 | 8/2006 | Veeger et al. |
| 2006/0193745 A1 | 8/2006 | Arndt et al. |
| 2006/0193789 A1 | 8/2006 | Tamarkin et al. |
| 2006/0221103 A1 | 10/2006 | Takanose et al. |
| 2006/0222502 A1 | 10/2006 | Hansen et al. |
| 2006/0229364 A1 | 10/2006 | Hobbs et al. |
| 2006/0235798 A1 | 10/2006 | Alkove et al. |
| 2006/0281663 A1 | 12/2006 | Asmus |
| 2007/0027055 A1 | 2/2007 | Koivisto et al. |
| 2007/0065383 A1 | 3/2007 | Fernandez de Castro et al. |

(56) References Cited

U.S. PATENT DOCUMENTS

| | | |
|---|---|---|
| 2007/0076125 A1 | 4/2007 | Choi et al. |
| 2007/0148101 A1 | 6/2007 | Snyder et al. |
| 2007/0179207 A1 | 8/2007 | Fernandez de Castro et al. |
| 2007/0184013 A1 | 8/2007 | Snyder et al. |
| 2007/0184016 A1 | 8/2007 | Macinga et al. |
| 2007/0185216 A1 | 8/2007 | Snyder et al. |
| 2007/0190177 A1 | 8/2007 | Kling et al. |
| 2007/0237807 A1 | 10/2007 | Luu et al. |
| 2007/0258911 A1 | 11/2007 | Fernandez de Castro et al. |
| 2007/0274926 A1 | 11/2007 | Fuls et al. |
| 2007/0274940 A1 | 11/2007 | Fuls et al. |
| 2007/0275929 A1 | 11/2007 | Fuls et al. |
| 2007/0280900 A1 | 12/2007 | Fox et al. |
| 2007/0280901 A1 | 12/2007 | Fuls et al. |
| 2007/0281039 A1 | 12/2007 | DeAth |
| 2007/0281999 A1 | 12/2007 | Fox et al. |
| 2008/0004449 A1 | 1/2008 | Yong et al. |
| 2008/0026974 A1 | 1/2008 | Barnhart et al. |
| 2008/0044479 A1 | 2/2008 | Stack |
| 2008/0095814 A1 | 4/2008 | Taylor et al. |
| 2008/0108704 A1 | 5/2008 | Asmus et al. |
| 2008/0121355 A1 | 5/2008 | Pylkki et al. |
| 2008/0138438 A1 | 6/2008 | Taylor et al. |
| 2008/0139656 A1 | 6/2008 | Taylor et al. |
| 2008/0142023 A1 | 6/2008 | Schmid et al. |
| 2008/0145390 A1 | 6/2008 | Taylor et al. |
| 2008/0199535 A1 | 8/2008 | Taylor et al. |
| 2008/0200890 A1 | 8/2008 | Wood et al. |
| 2008/0207767 A1 | 8/2008 | Dobos et al. |
| 2008/0213198 A1 | 9/2008 | Lintner et al. |
| 2008/0213595 A1 | 9/2008 | Levitt et al. |
| 2008/0249187 A1 | 10/2008 | Ali et al. |
| 2008/0254150 A1 | 10/2008 | Rheins et al. |
| 2008/0286223 A1 | 11/2008 | Fuls et al. |
| 2008/0287538 A1 | 11/2008 | Scholz et al. |
| 2009/0009806 A1 | 1/2009 | Matsuda |
| 2009/0012174 A1 | 1/2009 | Seitz, Jr. et al. |
| 2009/0018213 A1 | 1/2009 | Snyder et al. |
| 2009/0023890 A1 | 1/2009 | Monahan et al. |
| 2009/0046116 A1 | 2/2009 | Davies et al. |
| 2009/0062176 A1 | 3/2009 | Seidling et al. |
| 2009/0095821 A1 | 4/2009 | Feriani et al. |
| 2009/0104281 A1 | 4/2009 | Taylor et al. |
| 2009/0117061 A1 | 5/2009 | Gross |
| 2009/0191248 A1 | 7/2009 | Hoffman et al. |
| 2009/0202463 A1 | 8/2009 | Pan et al. |
| 2009/0214628 A1 | 8/2009 | de Rijk |
| 2009/0226541 A1 | 9/2009 | Scholz et al. |
| 2009/0252775 A1 | 10/2009 | Arndt et al. |
| 2009/0265230 A1 | 10/2009 | Plachouras et al. |
| 2009/0281021 A1 | 11/2009 | Venkataraman et al. |
| 2009/0304812 A1 | 12/2009 | Staniforth et al. |
| 2009/0324661 A1 | 12/2009 | Polonka et al. |
| 2009/0326076 A1 | 12/2009 | Asmus |
| 2010/0003198 A1 | 1/2010 | Stolmeier et al. |
| 2010/0022654 A1 | 1/2010 | Asmus et al. |
| 2010/0029780 A1 | 2/2010 | Grayson et al. |
| 2010/0069505 A1 | 3/2010 | Veeger et al. |
| 2010/0124280 A1 | 5/2010 | Chujoh et al. |
| 2010/0160453 A1 | 6/2010 | Koivisto et al. |
| 2010/0204323 A1 | 8/2010 | Theiler et al. |
| 2010/0282409 A1 | 11/2010 | Hobbs et al. |
| 2010/0305211 A1 | 12/2010 | Modak et al. |
| 2010/0317743 A1 | 12/2010 | Macinga et al. |
| 2010/0327013 A1 | 12/2010 | Asmus |
| 2010/0331411 A1 | 12/2010 | Asmus |
| 2010/0331422 A1 | 12/2010 | Asmus et al. |
| 2011/0104079 A1 | 5/2011 | Snyder et al. |
| 2011/0110869 A1 | 5/2011 | Scholz et al. |
| 2011/0144214 A1 | 6/2011 | Snyder et al. |
| 2011/0224144 A1 | 9/2011 | Akil et al. |
| 2011/0230395 A1 | 9/2011 | Otto et al. |
| 2011/0240065 A1 | 10/2011 | Panandiker et al. |
| 2011/0274770 A1 | 11/2011 | Scholz et al. |
| 2012/0011468 A1 | 1/2012 | Zhang |
| 2012/0053108 A1 | 3/2012 | Glenn, Jr. et al. |
| 2012/0121725 A1 | 5/2012 | Garnier et al. |
| 2012/0164087 A1 | 6/2012 | Carter |
| 2012/0189684 A1 | 7/2012 | Buckley et al. |
| 2012/0208894 A1 | 8/2012 | Kampf et al. |
| 2013/0303725 A1* | 11/2013 | Dobrawa ............... D21H 17/56 |
| | | 528/405 |
| 2014/0148374 A1 | 5/2014 | Man et al. |
| 2014/0332562 A1 | 11/2014 | Seidling et al. |
| 2014/0364509 A1* | 12/2014 | Wegner .................. A61K 8/893 |
| | | 514/724 |
| 2014/0369953 A1 | 12/2014 | Purschwitz et al. |
| 2015/0203443 A1 | 7/2015 | Klostermann et al. |
| 2016/0015031 A1 | 1/2016 | Pesaro et al. |
| 2016/0346178 A1* | 12/2016 | Wegner .................... A61K 8/34 |
| 2019/0295785 A1 | 9/2019 | Esposito de la Torella |
| 2020/0131453 A1 | 4/2020 | Dahlquist Howlett et al. |
| 2021/0009923 A1 | 1/2021 | Miller et al. |

FOREIGN PATENT DOCUMENTS

| | | | |
|---|---|---|---|
| EP | 0396442 A1 | 11/1990 | |
| EP | 0849070 A1 | 6/1998 | |
| EP | 0882446 A1 | 12/1998 | |
| EP | 0888434 B1 | 1/1999 | |
| EP | 1557160 A1 | 7/2005 | |
| EP | 1811013 B1 | 7/2007 | |
| EP | 2412791 A1 | 2/2012 | |
| EP | 2851416 B1 | 3/2015 | |
| EP | 3292757 A1 | 3/2018 | |
| GB | 2516261 A | 1/2015 | |
| JP | H03179098 A | 8/1991 | |
| JP | H03204809 A | 9/1991 | |
| JP | H0748245 A | 2/1995 | |
| JP | H07179332 A | 7/1995 | |
| JP | H07206634 A | 8/1995 | |
| JP | H10167938 A | 6/1998 | |
| JP | 2003012466 A | 1/2003 | |
| JP | 2018002683 A | 1/2018 | |
| JP | 2018008934 A | 1/2018 | |
| KR | 101366211 B1 | 2/2014 | |
| WO | 0135905 A2 | 5/2001 | |
| WO | 2003076117 A1 | 9/2003 | |
| WO | 2003084486 A1 | 10/2003 | |
| WO | 2003095600 A1 | 11/2003 | |
| WO | 2005051341 A3 | 6/2005 | |
| WO | 2006038019 A1 | 4/2006 | |
| WO | 2006094387 A1 | 9/2006 | |
| WO | 2006138111 A1 | 12/2006 | |
| WO | 2009027867 A3 | 3/2009 | |
| WO | WO-2015061552 A1 * | 4/2015 | ............ A61K 8/046 |
| WO | 2016085906 A1 | 6/2016 | |

OTHER PUBLICATIONS

International Searching Authority in connection with PCT/US2021/040506 filed Jul. 6, 2021, "The International Search Report and the Written Opinion of the International Searching Authority, or the Declaration", 15 pages, mailed Nov. 4, 2021.

International Searching Authority in connection with PCT/US2021/040526 filed Jul. 6, 2021, "The International Search Report and the Written Opinion of the International Searching Authority, or the Declaration", mailed Nov. 5, 2021.

Bergfeld, Wilma F., et al., "Safety Assessment of Alkoxy Polysiloxanes as Used in Cosmetics", Draft Report for Panel Review, 235 pages, 2014.

Brehm-Stecher, Johnson, "Sensitization of Staphylococcus aureus and Escherichia coli to Antibiotics by the Sesquiterpenoids Nerolidol, Farnesol, Bisabolol, and Apritone", American Society for Microbiology, Antimicrobial Agents and Chemotherapy, vol. 47, No. 10, pp. 3357-3360, Oct. 2003.

Cosmocil (TM) Folder, 5 pages, Jun. 9, 2014.

Intrinsic Activity of Cosmocil CQ, Avecia, 2 pages, Jun. 9, 2014.

Morton, H., "The relationship of concentration and germicidal efficiency of ethyl alcohol", Annals of the New York Academy of Sciences, vol. 52, XP008066591, pp. 191-196, Dec. 31, 1950.

(56) References Cited

OTHER PUBLICATIONS

Australian Government, "Patent Examination Report No. 1", issued in connection with Patent Application 2009275235, 4 pages, mailed Oct. 29, 2014.
Australian Government, "Patent Examination Report No. 2", issued in connection with Patent Application No. 2009275235, 4 pages, mailed Feb. 27, 2015.
O'Lenick, Tony, "Bis-PEG vs. PEG dimethicone", Cosmetics and Toiletries, http://www.cosmeticsandtoiletries.com/research/chemistry/7847427, 2 pages, 2007.
PEL-SIL ™ bis-PEG-12 Datasheet, Ele Corporation, 3 pages, Oct. 10, 2019.
Schloss Man, M. (Ed.): "The chemistry and manufacture of cosmetics: Formulating, vol. 2, Ed. 3", Allured Pub., USA 277870, XP002390779, pp. 237-239, Dec. 31, 2000.
European Patent Office, "Supplementary European Search Report", issued in connection with Application No./Patent No. 11796409.8-1354 / 2802636 PCT/US20211040626, 7 pages, mailed Dec. 9, 2014.
Technical Information from BASF for Bisabolol, 8 pages, Nov. 20, 2002.
Technical Specification for Farnesol, Symrise, 2 pages, Jun. 1, 2004.
Worldwide Healthcare, Inc., "Material Safety Data Sheet", 2 pages, Jan. 24, 2007.

\* cited by examiner

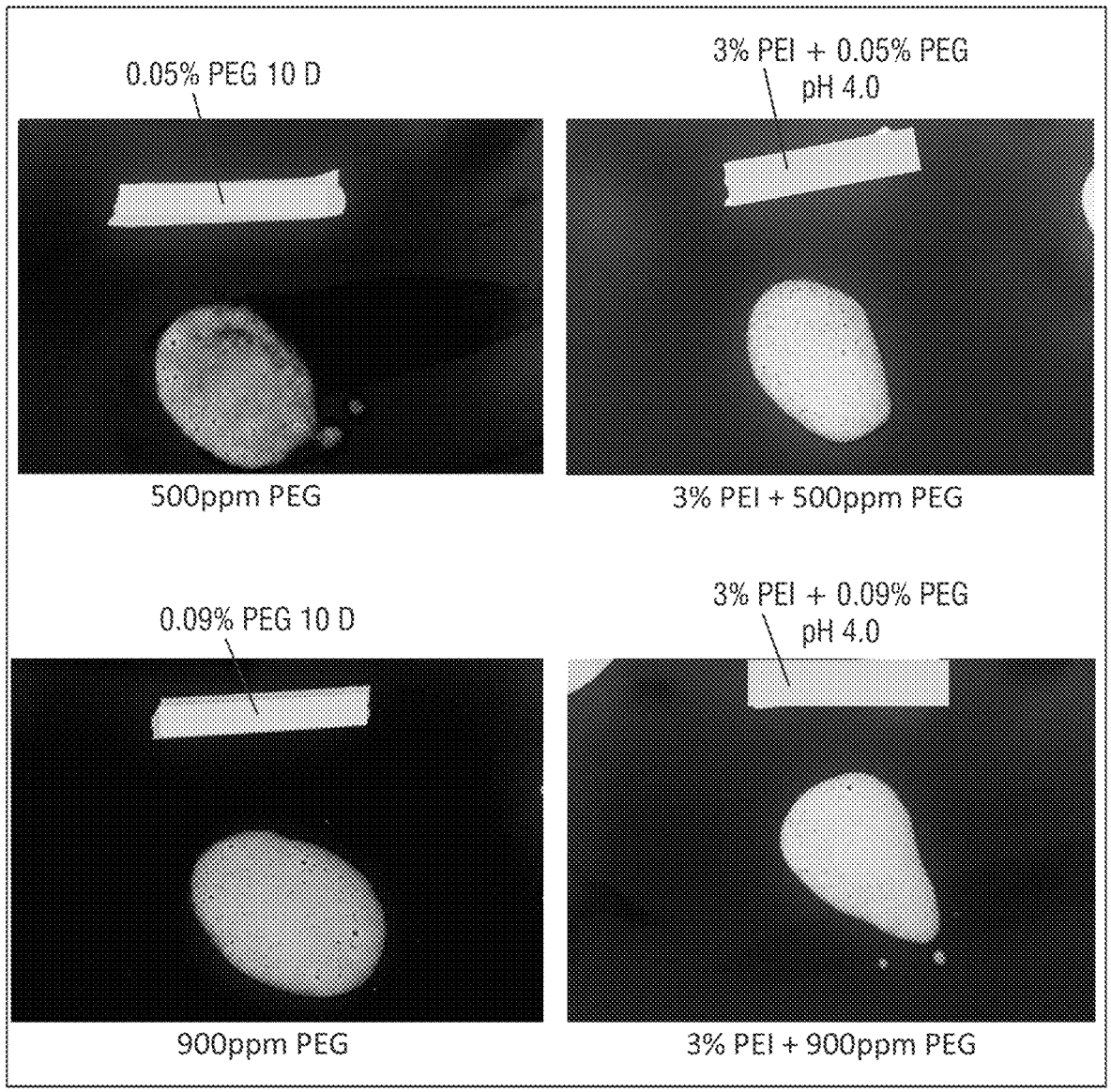

FOAMING MIXED ALCOHOL/WATER COMPOSITIONS COMPRISING A STRUCTURED ALKOXYLATED SILOXANE

CROSS-REFERENCE TO RELATED APPLICATION

This application claims priority under 35 U.S.C. § 119 to Provisional Application U.S. Ser. No. 62/705,589, filed on Jul. 6, 2020, which is herein incorporated by reference in its entirety including without limitation, the specification, claims, and abstract, as well as any figures, tables, or examples thereof.

FIELD

The disclosure relates to compositions and methods of use which employ a alkoxylated structured siloxane, traditionally used as a defoaming agent, for use in foaming alcohol/water compositions. These foaming compositions have many benefits including the ease of formation of foam in both high alcohol alcohol/water solutions and condensed hydrocarbons without long term stabilization of the foam.

BACKGROUND

Foaming compositions may reduce the surface tension of a liquid by adsorbing at the liquid-gas interface. They may also reduce the interfacial tension between oil or alcohol and water by adsorbing at the liquid-liquid interface. These foaming compositions have a hydrophilic section that is attracted to water molecules and a hydrophobic section that repels water and simultaneously attaches itself to compounds, which include hydrocarbons. This reduction in surface tension allows the liquid to foam by making it more energetically favorable to create new surface. Antifoaming and defoaming agents, such as structured siloxane defoamers, in contrast are generally insoluble and interact with the lamellar surface of the foam, disrupting the foam surface, and causing the foam to rupture.

Certain liquids, like alcohols, have a very low surface tension and will not sufficiently dissolve surfactants due to their hydrophilic regions. Other liquids, like water, do not sufficiently dissolve defoamers due to their hydrophobic regions. Hence, alcohol/water compositions require specific compounds to sufficiently foam, especially at high alcohol content. Alcohols, for example, have only two main classes of compounds which may lower their surface tension sufficiently to allow foaming: silicone-based and fluoride-based surfactants.

Due to the limited number of known agents which can foam these low surface tension liquids, availability may be limited. Further, as surfactants are mostly insoluble in the alcohol/water compositions due to their poor compatibility with alcohol, different compounds may be needed in order to replace surfactants as foaming agents. Therefore, there is a need to identify additional compounds that may be used to foam in these low surface tension liquids.

SUMMARY

Applicant has identified a that structured siloxanes, with a dimethylpolysiloxane PDMS backbone and hydrophobic alkoxy modifications can be used as foaming agents in low surface tension liquid formulations.

In an embodiment, the alkyl siloxanes must be linear include those of the general formula:

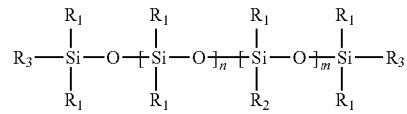

n is 0-30,
m 1-50,
R1, R2, and R3 are methyl, except when
one or both of R2 and R3 are (AO)xY
where AO is propylene oxide or butylene oxide; x is 1-100 and Y is H or alkyl These structured siloxanes are not surfactants due to their insolubility and are traditionally used and designed as defoaming agents.

Additional compounds may be used in conjunction with the structured siloxanes to foam the alcohol/water compositions. By way of nonlimiting example, these additional compounds may include polypropylene glycol homopolymers, propoxylated esters, ethoxylated alkane alcohols, ethoxylated alkyne alcohols, and/or alkanes.

In preferred embodiments, ranges of the siloxane backbone length and the total PO groups are mostly dictated by the solubility in the mixed alcohol/water systems, for example from about 1 to 100 siloxane units and a total PO groups of 4,000 to 5,500 MW are preferred for high alcohol content, such as greater than about 90% alcohol.

The foaming alcohol/water composition may be useful for cleaning compositions which includes the foaming compositions and other constituents, such as builders, enzymes, and the like; the inhibition or prevention of gas hydrate blockage; hand sanitizers; foaming hydrocarbon condensates; or be applied as a dry lube.

These and other objects, features and attendant advantages of the present disclosure will become apparent to those skilled in the art from a reading of the following detailed description of the preferred embodiment and the appended claims.

DESCRIPTION OF THE FIGURE

FIG. 1 are photographs showing at the same concentration of PEG 10 dimethicone, the 3% PEI greatly enhanced the foam stability. Therefore, ethanol/water compositions may be foamed using a higher level of polyethylene imine derivatives with a much lower foaming agents to achieve desired foam results.

DETAILED DESCRIPTION

The embodiments of this disclosure are not limited to particular applications of use for the inventive surfactant systems, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

An "antiredeposition agent" refers to a compound that helps keep suspended in water instead of redepositing onto the object being cleaned. Antiredeposition agents are useful in the present disclosure to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "cleaning composition" includes, unless otherwise indicated, detergent compositions, laundry cleaning compositions, hard surface cleaning compositions, including pretreatments or rinse aids, and personal care cleaning compositions for use in the health and beauty area. Cleaning compositions include granular, powder, liquid, gel, paste, bar form and/or flake type cleaning agents, laundry detergent cleaning agents, laundry soak or spray treatments, fabric treatment compositions, dish washing detergents and soaps, shampoos, body washes and soaps, and other similar cleaning compositions. As used herein, the term "fabric treatment composition" includes, unless otherwise indicated, fabric softening compositions, fabric enhancing compositions, fabric freshening compositions and combinations thereof. Such compositions may be, but need not be, rinse added compositions.

The term "electrolyte" refers to a substance that will provide ionic conductivity when dissolved in water or when in contact with it; such compounds may either be solid or liquid.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces, instruments and the like.

The term "hydrotrope" as used herein is a compound that solubilizes a hydrophobic compound in an aqueous solution. A hydrotrope generally has a hydrophilic region and a hydrophobic region that are too small to cause spontaneous self-aggregation. As such, hydrotropes, unlike surfactants, generally lack a critical micelle concentration or a critical vesicle concentration.

The term "soft surface" refers to a softer, highly flexible material such as fabric, carpet, hair, and skin.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated.

Exemplary treated fibers include those treated for flame retardancy. It should be understood that the term "linen" is often used to describe certain types of laundry items including bed sheets, pillow cases, towels, table linen, table cloth, bar mops and uniforms. The disclosure additionally provides a composition and method for treating non-laundry articles and surfaces including hard surfaces such as dishes, glasses, and other wares.

As used herein, the term "microemulsion" refers to thermodynamically stable, isotropic dispersions consisting of nanometer size domains of water and/or oil stabilized by an interfacial film of surface-active agent characterized by ultra-low interfacial tension.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt. %. More preferably, the amount of phosphate is less than 0.1 wt. %, and most preferably, the amount of phosphate is less than 0.01 wt. %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt. %. More preferably, the amount of phosphorus is less than 0.1 wt. %, and most preferably the amount of phosphorus is less than 0.01 wt. %.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

"Soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in other embodiments, the amount of component is less than 0.01 wt. %, less than 0.001 wt. %, or less than 0.0001 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "surfactant" as used herein is a compound that contains a lipophilic segment and a hydrophilic segment, which when added to water or solvents, reduces the surface tension of the system. The lipophilic and hydrophilic segments of a surfactant are sufficiently large enough to cause spontaneous self-aggregation. Surfactants are soluble in water.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the disclosure include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the disclosure include polyethylene terephthalate (PET) and polystyrene polyamide.

The term "weight percent," "wt.-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt.-%," etc.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed bacteriocidal and the later, bacteriostatic. A sanitizer and a disinfectant are, by definition, agents which provide antibacterial or bacteriocidal activity. In contrast, a preservative is generally described as an inhibitor or bacteriostatic composition.

The term "sanitizer," as used herein, refers to an agent that reduces the number of bacterial contaminants to safe levels as judged by public health requirements. The recitation of numerical ranges by endpoints includes all numbers subsumed within that range (e.g., 1 to 5 includes 1, 1.5, 2, 2.75, 3, 3.80, 4, and 5).

The methods and compositions of the present disclosure may comprise, consist essentially of, or consist of the components and ingredients of the present disclosure as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Siloxane Foaming Composition

The challenge to foam alcohol/water solution interfaces is due to its already low surface tension (~25 mN/m² for a 70% ethanol/water solution). Most surfactants, with the exceptions of silicone-based and fluoride-based surfactants, are incapable of reducing the surface tension to such low value to allow for foaming. It has been discovered that a structured siloxane may provide sufficient foam to alcohol/water solutions and hydrocarbon condensates.

Structured Siloxanes

The structured siloxanes include a PDMS dimethylpolysiloxane or dimethicone backbone and hydrophobic alkoxy modifications.

In an embodiment, the structured siloxanes include those of the general formula:

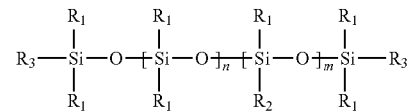

n is 0-30,
m 1-50,
R1, R2, and R3 are methyl, except when
one or both of R2 and R3 are (AO)xY where AO is propylene oxide or butylene oxide; x is 1-100 and Y is H or alkyl, or a polymer of one or more of polypropylene glycol (PO), polyethylene glycol (PEG or EO), and/or polybutylene glycol (BO).

The total of the weight of the polymer preferably ranges from 1,000 to about 6,000, more preferably from about 2,000 to about 5,500. $R_2$ may be free of polyethylene glycol (PEG or EO).

Some examples of commercially available structured siloxanes are the Airase 5X00 line, including Airase 5100 through Airase 5700 (available from Evonik), Silsurf DI-15-I (hydroxyalkyl terminated poly(propyleneoxy)-polydimethylsiloxane black copolymer, MW about 2,400), DBP-C22 (hydroxyalkyl terminated poly(propyleneoxy)-polydimethylsiloxane black copolymer MW 2,500-3,200), and CMS-222 ((hydroxypropyleneoxypropyl)methysiloxane-dimethylsiloxane copolymer, MW 5,500-6,500).

Additional compounds may be used in conjunction with the alkyl siloxanes to foam the alcohol/water compositions. By way of nonlimiting example, these additional compounds may include polypropylene glycol homopolymers, propoxylated esters, ethoxylated alkane alcohols, ethoxylated alkyne alcohols, and/or alkanes.

In preferred embodiments, ranges of siloxane backbone length and the total PO groups are mostly dictated by the solubility in the mixed ethanol/water systems, and from about 1 to 100 siloxane units and a total PO groups of 4,000 to 5,500 MW are preferred for high alcohol content, such as greater than about 90% ethanol.

Alcohol

In addition to water, the composition includes an alcohol. The alcohol is preferably a lower chain alcohol such as a $C_2$-$C_4$ alcohol. Examples of suitable alcohols include ethanol, propanols, such as isopropanol and n-propanol, and butanols. The alcohol is preferably ethanol.

The composition may contain one alcohol, or a mixture of two or more alcohols. The alcohol is preferably present in the composition in an amount of active alcohol from about 50 to about 90 wt. %, from about 54 to about 85 wt. %, and from about 60 to about 80 wt. %.

Alcohol/Water Solutions Employing a Siloxane Foaming Composition

Cleaning Composition Formulations

In another embodiment the foaming compositions are formulated in cleaning compositions such as a ware wash or laundry detergent which include a builder, and other traditional components such as enzymes. Examples of such standard laundry, warewash components and formulations, which are well known to those skilled in the art, are provided in the following paragraphs.

The composition can be provided in solid or liquid form and includes, for example, an alkalinity source, a metal protector (for warewash), a foaming agent of the disclosure, water, and a threshold agent, and other optional components, such as surfactants or surfactant systems. Typical formulations can include form about 30% and about 80% by weight alkalinity source, between about 15% and about 35% by weight metal protector, between about 0.1% and about 10% by weight foaming agent, between about 0.1% and about 20% by weight water, between about 0.2% and about 15% by weight threshold agent. If a scale inhibitor is present it is present in an amount of from about 0 to about 15% by weight.

Yet another embodiment includes hard surface cleaning composition with the surfactant system of the disclosure, an acid source or source of alkalinity, and optionally a solvent, a water conditioning agent, and water to make a hard surface cleaner which will be effective at removing greasy and oily soils from surfaces such as showers, sinks, toilets, bathtubs, countertops, windows, mirrors, transportation vehicles, floors, and the like. These surfaces can be those typified as "hard surfaces" (such as walls, floors, bed-pans).

A typical hard surface formulation at about 18% activity includes between about 40 wt. % and about 80 wt. % foaming agent of the disclosure, between about 3 wt. % and about 18 wt. % water conditioning agent, between about 0.1 wt. % and about 0.55 wt. % acid or alkalinity source, between about 0 wt. % and about 10 wt. % solvent and between about 10 wt. % and about 60 wt. % water.

Particularly, the cleaning compositions include between about 45 wt. % and about 75 wt. % foaming agent of the disclosure, between about 0 wt. % and about 10 wt. % optional co-surfactant, between about 5 wt. % and about 15 wt. % water conditioning agent, between about 0.3 wt. % and about 0.5 wt. % acid or alkalinity source, between about 0 and about 6 wt. % solvent and between about 15 wt. % and about 50 wt. % water. In other embodiments, similar intermediate concentrations and use concentrations may also be present in the cleaning compositions of the disclosure.

Additional traditional cleaning components.

Chelating Agent

The composition may optionally include a chelating agent. Examples of chelating agents include phosphonic acid and phosphonates, phosphates, aminocarboxylates and their derivatives, pyrophosphates, ethylenediamine and ethylenetriamine derivatives, hydroxyacids, and mono-, di-, and tri-carboxylates and their corresponding acids. Other chelating agents include nitroloacetates and their derivatives, and mixtures thereof. Examples of aminocarboxylates include amino acetates and salts thereof. Suitable amino acetates include: N-hydroxyethylaminodiacetic acid; hydroxyethylenediaminetetraacetic acid; nitrilotriacetic acid (NTA); ethylenediaminetetraacetic acid (EDTA); Nhydroxyethyl-ethylenediaminetriacetic acid (HEDTA); tetrasodium ethylenediaminetetraacetic acid (EDTA); diethylenetriaminepentaacetic acid (DTPA); and alanine-N,N-diacetic acid; n-hydroxyethyliminodiacetic acid; and the like; their alkali metal salts; and mixtures thereof. Suitable aminophosphates include nitrilotrismethylene phosphates and other aminophosphates with alkyl or alkaline groups with less than 8 carbon atoms. Exemplary polycarboxylates iminodisuccinic acids (IDS), sodium polyacrylates, citric acid, gluconic acid, oxalic acid, salts thereof, mixtures thereof, and the like. Additional polycarboxylates include citric or citrate-type chelating agents, polymeric polycarboxylate, and acrylic or polyacrylic acid-type chelating agents. Additional chelating agents include polyaspartic acid or co-condensates of aspartic acid with other amino acids, C4-C25mono-or-dicarboxylic acids and C4-C25-mono-or-diamines. Exemplary polymeric polycarboxylates include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

The chelating agent may be present in an amount from about 0.01 to about 5 wt. %, from about 0.05 to about 3 wt. %, and from about 0.1 to about 1.5 wt. %.

Preservatives

The composition may optionally include a preservative. Generally, preservatives fall into specific classes including phenolics, halogen compounds, quaternary ammonium compounds, metal derivatives, amines, alkanolamines, nitro derivatives, biguanides, analides, organosulfur and sulfur-nitrogen compounds, alkyl parabens, and miscellaneous compounds. Some non-limiting examples of phenolic antimicrobial agents include pentachlorophenol, orthophenylphenol, chloroxylenol, p-chloro-m-cresol, p-chlorophenol, chlorothymol, m-cresol, o-cresol, p-cresol, isopropyl cresols, mixed cresols, phenoxyethanol, phenoxyethylparaben, phenoxyisopropanol, phenyl paraben, resorcinol, and derivatives thereof. Some non-limiting examples of halogen compounds include trichlorohydroxy diphenyl ether (Triclosan), sodium trichloroisocyanurate, sodium dichloroisocyanurate, iodine-poly(vinylpyrolidin-onen) complexes, and bromine compounds such as 2bromo-2-nitropropane-1,3-diol, and derivatives thereof. Some non-limiting examples of quaternary ammonium compounds include benzalkonium chloride, benzethonium chloride, behentrimonium chloride, cetrimonium chloride, and derivatives thereof. Some non-limiting examples of amines and nitro containing compounds include hexahydro-1,3,5-tris(2-hydroxyethyl)-s-triazine, dithiocarbamates such as sodium dimethyldithiocarbamate, and derivatives thereof. Some non-limiting examples of biguanides include polyaminopropyl biguanide and chlorhexidine gluconate. Some non-limiting examples of alkyl parabens include methyl, ethyl, propyl and butyl parabens. The preservative is preferably present in the composition in an amount from about 0 to about 3 wt. %, from about 0.1 to about 2 wt. %, and from about 0.2 to about 1 wt. %.

Thickener

The composition may optionally include a thickener. Exemplary thickeners include (1) cellulosic thickeners and their derivatives, (2) natural gums, (3) starches, (4) stearates, (5) fatty acid alcohols and (6) Polyethylene Oxide. Some non-limiting examples of cellulosic thickeners include carboxymethyl hydroxyethylcellulose, cellulose, hydroxybutyl methylcellulose, hydroxyethylcellulose, hydroxypropylcellulose, hydroxypropyl methyl cellulose, methylcellulose, microcrystalline cellulose, sodium cellulose sulfate, and the like. Some non-limiting examples of natural gums include acacia, calcium carrageenan, guar, gelatin, guar gum, hydroxypropyl guar, karaya gum, kelp, locust bean gum, pectin, sodium carrageenan, tragacanth gum, xanthan gum, and the like. Some non-limiting examples of starches include oat flour, potato starch, wheat flour, wheat starch, and the like. Some non-limiting examples of stearates include PEG-150 distearate, methoxy PEG-22/dodecyl glycol copolymer, and the like. Some non-limiting examples of fatty acid alcohols include caprylic alcohol, cetearyl alcohol, lauryl alcohol, oleyl alcohol, palm kernel alcohol, and the like.

The amount of thickener in the composition depends on the desired viscosity of the composition. The composition preferably has a viscosity low enough to pump through a foamer such as an Airspray foamer and allow foaming.

The foaming compositions of the disclosure may replace the surfactants found in cleaning compositions due to the synergistic hydrophilic region on the PEG-modified castor oil and a hydrophobic region on both the alkyl siloxane and the PEG-modified castor oil. The foaming compositions of the disclosure may be used alone, as a pre-spot or pre-treatment composition in combination with a traditional detergent or cleaner or may be incorporated within a cleaning composition. The disclosure comprises both hard surface and soft surface cleaning compositions employing the disclosed surfactant system.

In one embodiment, the disclosure employs the foaming compositions of the disclosure, an acid source, a solvent, a water conditioning agent, and water to make a hard surface cleaner which will be effective at removing greasy and oily soils from surfaces such as showers, sinks, toilets, bathtubs, countertops, windows, mirrors, transportation vehicles, floors, and the like. These surfaces can be those typified as "hard surfaces" (such as walls, floors, bed-pans).

A typical hard surface formulation at about 18% activity includes between about 40 wt. % and about 80 wt. % foaming compositions of the disclosure, between about 3 wt. % and about 18 wt. % water conditioning agent, between about 0.1 wt. % and about 0.55 wt. % acid source, between about 0 wt. % and about 10 wt. % solvent and between about 10 wt. % and about 60 wt. % water.

Particularly, the cleaning compositions include between about 45 wt. % and about 75 wt. % foaming compositions of the disclosure, between about 0 wt. % and about 10 wt. % optional co-surfactant, between about 5 wt. % and about 15 wt. % water conditioning agent, between about 0.3 wt. % and about 0.5 wt. % acid source, between about 0 and about 6 wt. % solvent and between about 15 wt. % and about 50 wt. % water. In other embodiments, similar intermediate concentrations and use concentrations may also be present in the cleaning compositions of the disclosure.

In a laundry detergent formulation, the compositions of the disclosure typically include the foaming compositions of the disclosure, and a builder, optionally with an enzyme. Examples of such standard laundry detergent ingredients, which are well known to those skilled in the art, are provided in the following paragraphs.

While not essential for the purposes of the present disclosure, the non-limiting list of additional components illustrated hereinafter are suitable for use in the instant compositions and may be desirably incorporated in certain embodiments of the disclosure, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, surfactants, builders, chelating agents, dye transfer inhibiting agents, viscosity modifiers, dispersants, additional enzymes, and enzyme stabilizers, catalytic materials, bleaches, bleach activators, hydrogen peroxide, sources of hydrogen peroxide, preformed peracids, polymeric dispersing agents, threshold inhibitors for hard water precipitation, pigments, clay soil removal/anti-redeposition agents, brighteners, suds suppressors, dyes, fabric hueing agents, perfumes, structure elasticizing agents, fabric softeners, carriers, additional hydrotropes, processing aids, solvents, antimicrobials, pH buffers, active fluorescent whitening ingredient, additional surfactants and mixtures thereof. In addition to the disclosure below, suitable examples of such other adjuncts and levels of use are found in U.S. Pat. Nos. 5,576,282, 6,306, 812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below:

The liquid detergent herein has a neat pH of from about 7 to about 13, or about 7 to about 9, or from about 7.2 to about 8.5, or from about 7.4 to about 8.2. The detergent may contain a buffer and/or a pH-adjusting agent, including inorganic and/or organic alkalinity sources and acidifying agents such as water-soluble alkali metal, and/or alkali earth metal salts of hydroxides, oxides, carbonates, bicarbonates, borates, silicates, phosphates, and/or metasilicates; or sodium hydroxide, potassium hydroxide, pyrophosphate, orthophosphate, polyphosphate, and/or phosphonate. The organic alkalinity source herein includes a primary, secondary, and/or tertiary amine. The inorganic acidifying agent herein includes HF, HCl, HBr, HI, boric acid, sulfuric acid, phosphoric acid, and/or sulphonic acid; or boric acid. The organic acidifying agent herein includes substituted and substituted, branched, linear and/or cyclic $C_{1-30}$ carboxylic acid.

Bleaching Agents

The cleaning compositions of the present disclosure may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present disclosure may comprise from about 0.1% to about 50% or even from about 0.1% to about 25% bleaching agent by weight of the subject cleaning composition. Examples of suitable bleaching agents include:

(1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen; (2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the disclosure the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the disclosure the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Positively Charged Polymer

In certain embodiments the composition can include a positively charged polymer for additional foam stabilization.

Positively Charged Polymer

According to the invention, the positively charged class of polymers such as polyethyleneimine (PEI) and its derivatives such as alkoxylated and/or ethoxylated (PEI) polymers, polyamines, polyquats, polyglycerol quats, and other PEI derivatives, their salts or mixtures may used in the compositions of the invention. PEI is a polymeric amine or a polyamine, and include, polyethyleneimine compounds (PEI) and/or its derivatives. Polyethyleneimines may include primary, secondary or tertiary amine compounds. The polyethyleneimine compounds and/or its derivatives may include linear and/or branched polyethyleneimines. Still further, polyethyleneimines and/or its derivatives can vary significantly in molecular weight, topology and shape, including for example linear, branched or comb-like structures as a result of ring-opening polymerization of the ethylenimine. See Angelescu et al., Langmuir, 27, 9961-9971 (2011), which is incorporated herein by reference in its entirety. According to an aspect of the invention, the bleach activator may be a linear and/or branched polyethyleneimine.

According to the invention, the positively charged class of polymers such as polyethyleneimine (PEI) and its derivatives such as ethoxylated (PEI) polymers, propoxylated (PEI) polymers, polyamines, polyquats, polyglycerol quats, and other PEI derivatives, their salts or mixtures thereof are used in foaming compositions to provide the electrostatic interaction with surfactants present in the foaming compositions, particularly preferred are ethoxylated or propoxylated PEI polymers. In preferred such embodiments, the PEI or PEIs are branched, spherical polymeric amines, and the molecular weight of the PEI or PEI salt used is from about 800 daltons to about 2 million Daltons. In addition, in preferred such embodiments, the charge density of the PEI or PEI salt used is from about 15 meq/g to about 25 meq/g, more preferably from about 16 meq/g to about 20 meq/g. Examples of such preferred PEIs include the BASF products LUPASOL WF (25 kDa; 16-20 meq/g) and Lupasol® FG (800 daltons; 16-20 meq/g), and the SOKALAN® family of polymers available from BASF, e.g., SOKALAN® HP20, SOKALAN® HP22 G, and the like.

According to the invention, cleaning compositions are formed with an detersive amount of an anionic surfactant (from about 1 wt. % to about 75 wt. %) and from about 0.01 wt. % to about 5.0 wt. % of ethoxylated PEI or other similarly positive charged polymer such as polyamines, polyquats, polyclycerol quats, and products commercially available from Nalco such as VX10035 a propoxylated PEI and two other Nalco products, VX9945 and VX9946, in which the PEI is first propoxylated then exthoxylated.

Linear polyethyleneimines are made by the cationic polymerization of oxazoline and oxazine derivatives. Methods for preparing linear PEIs are more fully described in Advances in Polymer Science, Vol. 102, pgs. 171-188, 1992 (references 6-31) which is incorporated in its entirety herein by reference. Polyethyleneimines can also be made by the polymerization of aziridine to afford a polymeric amine often containing primary, secondary, and tertiary amine functionality. Commercial preparation of PEIs are generally acid-catalyzed reactions to open the ring of ethyleneimine, also known as aziridine as shown below.

Suitable polyethyleneimine compounds useful in the present invention may contain a mixture of primary, secondary, and tertiary amine substituents. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

Exemplary PEI products include multifunctional cationic polyethyleneimines with branched polymer structures according to the following formulas (—(CH2-CH2-NH)n-), with a molecular mass of 43.07 (as repeating units). In certain aspects the formula (—(CH2-CH2-NH)n-) has a value of n that is at least 10 to 105, and wherein the nitrogen to carbon ratio is 1:2. PEI polymers have the general following polymer structure:

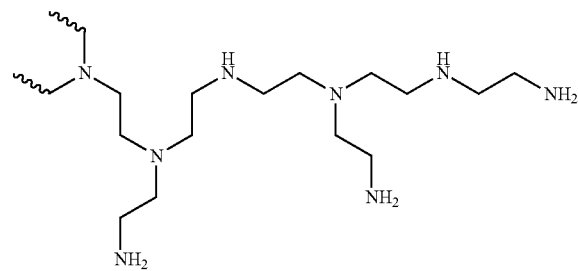

PEI products can also be represented by the following general formula, which may vary according to substitutions, size, molecular weight, branching, and the like:

wherein x is an integer that is 1 or greater and y is an integer that is 1 or greater than 1. Preferably, wherein x is an integer from about 1 to about 120,000, preferably from about 2 to about 60,000, more preferably from about 3 to about 24,000 and y is an integer from about 1 to about 60,000, preferably from about 2 to about 30,000, more preferably from about 3 to about 12,000.

Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. Such exemplary polyethyleneimines are available as anhydrous polyethyleneimines and/or modified polyethyleneimines provided in aqueous solutions or methoyxypropanol (Lupasol® PO 100). The molar mass of the polyethyleneimines, including modified polyethyleneimines can vary from about 800 g/mol to at least 2,000,000 g/mol.

In certain aspects the polymeric amine bleach activators, and preferably the PEI bleach activators, may be a branched, spherical polymeric amine. In further aspects, the molecular weight of the polymeric amine bleach activators or PEI bleach is from about 100 Daltons to about 2 million Daltons (PEI-2,000,000), more preferably from about 100 Daltons to about 1 million Daltons (PEI-1,000,000), more preferably from about 500 Daltons to about 500 kDa (PEI-500,000), more preferably from about 500 Daltons to about 50 kDa (PEI-50,000), more preferably from about 800 Daltons to about 50 kDa (PEI-50,000), more preferably from about 800 Daltons to about 10 kDa (PEI-10,000). In further aspects, the charge density of the PEI or PEI salt is from about 15 meq/g to about 25 meq/g, more preferably from about 16 meq/g to about 20 meq/g. Commercially-available examples of such preferred PEIs include the BASF products LUPASOL☐ WF (25 kDa; 16-20 meq/g) and Lupasol☐ FG (800 Daltons; 16-20 meq/g), and the BASF products in the SOKALAN☐ family of polymers, e.g., SOKALAN☐ HP20, SOKA-LAN☐ HP22 G, and the like.

In an aspect, a polymeric amine may contain other substituents and/or and copolymers. For example, a polymeric amine may also include substituents, including for example ethoxylates and propoxylates. In an aspect of the invention, the polymeric amine, such as a polyethyleneimines, are derivatized with ethylene oxide (EO) and/or propylene oxide (PO) side chains. According to the invention, the PEI does not contain propylene oxide side chains. In an exemplary aspect of the invention ethoxylated PEIs may be heavily branched, wherein the substitutable hydrogens on the primary and secondary nitrogens are replaced with ethoxylated chains containing varying degrees of repeating units, such as the following polymer structure (generic for PEI20EO):

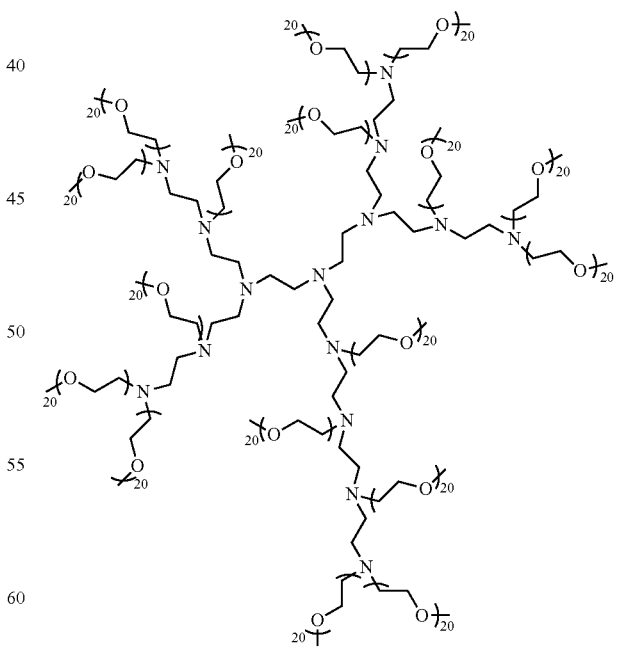

In an aspect, the positively charged polymer is a polyethyleneimine polymer with ethyleneoxide chains. Ethoxylation of PEIs increases the solubility of the bleach activator according to the invention.

A polymeric amine may also include copolymers, including for example ethylenediamine. A variety of substituents and/or copolymers may be included in order to modify the solubility or any other physical characteristics of a particular polymeric amine employed as a bleach activator according to the invention.

Because of the presence of amine groups, PEI can be protonated with acids to form a PEI salt from the surrounding medium resulting in a product that is partially or fully ionized depending on pH. For example, about 73% of PEI is protonated at pH 2, about 50% of PEI is protonated at pH 4, about 33% of PEI is protonated at pH 5, about 25% of PEI is protonated at pH 8 and about 4% of PEI is protonated at pH 10. In general, PEIs can be purchased as their protonated or unprotonated form with and without water. An example of a segment of a branched protonated polyethyleneimine (PEI salt) is shown below:

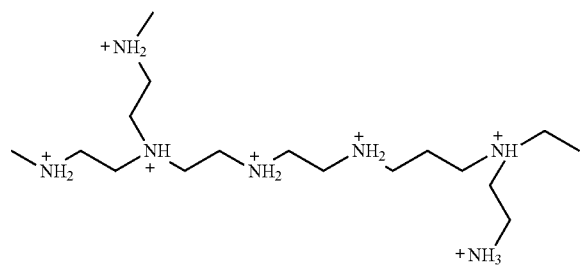 [SMILES: CCN(CCN)CCCNCCNCCN(CCNC)CCNC]

The counterion of each protonated nitrogen center is balanced with an anion of an acid obtained during neutralization. Examples of protonated PEI salts include, but are not limited to, PEI-hydrochloride salt, PEI-sulfuric acid salt, PEI-nitric acid salt, PEI-acetic acid salt PEI fatty acid salt and the like. In fact, any acid can be used to protonate PEIs resulting in the formation of the corresponding PEI salt compound.

The cationic polymer, PEI is present in an amount of from about 0.01 wt. % 1 to about 5 wt. %. At greater than 5 wt % the affect is decreased and this is a critical upper limit.

Hydrotropes

The compositions of the invention may include one or more hydrotropes that aide in compositional stability and aqueous formulation. Functionally speaking, the suitable hydrotrope couplers which can be employed are non-toxic and retain the active ingredients in aqueous solution throughout the temperature range and concentration to which a concentrate or any use solution is exposed.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and C8-C10 alkyl glucosides. Preferred coupling agents for use in the present invention include n-octanesulfonate, available as NAS 8D from Ecolab Inc., n-octyl dimethylamine oxide, and the commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of C6-C24 alcohol alkoxylates (alkoxylate means ethoxylates, propoxylates, butoxylates, and co-or-terpolymer mixtures thereof) (preferably C6-C14 alcohol alkoxylates) having 1 to about 15 alkylene oxide groups (preferably about 4 to about 10 alkylene oxide groups); C6-C24 alkylphenol alkoxylates (preferably C8-C10 alkylphenol alkoxylates) having 1 to about 15 alkylene oxide groups (preferably about 4 to about 10 alkylene oxide groups); C6-C24 alkylpolyglycosides (preferably C6-C20 alkylpolyglycosides) having 1 to about 15 glycoside groups (preferably about 4 to about 10 glycoside groups); C6-C24 fatty acid ester ethoxylates, propoxylates or glycerides; and C4-C12 mono or dialkanolamides. A preferred hydrotrope is sodium xylenesulfonate (SXS).

In a preferred embodiment the hydrotrope is castor oil. Caster oil is a plant-derived oil obtained from the seeds (castor beans) of the plant *Ricinus communis*. It is a mixture of triglycerides composed of several different fatty acids. It is a mono-unsaturated fat, with a one double carbon-carbon bond per arm of the triglyceride. The major component is ricinoleic acid, with the remainder of the oil being comprised of oleic, linoleic, stearic, and several other organic acids.

The chemistry of the major component of ricinoleic acid is distinct among triglycerides. This fatty acid possesses hydroxyl (—OH) groups on each arm of the molecule, which make it more polar than other fatty acids. The hydroxyl group also facilitates chemical modification of the triglyceride, allowing creation of derivatives with desired properties for many different applications. The hydrotrope is an ethoxylated caster oil, either hydrogenated or non hydrogenated. The PEG modified castor oil for use in embodiments of the disclosure include those of the general formula:

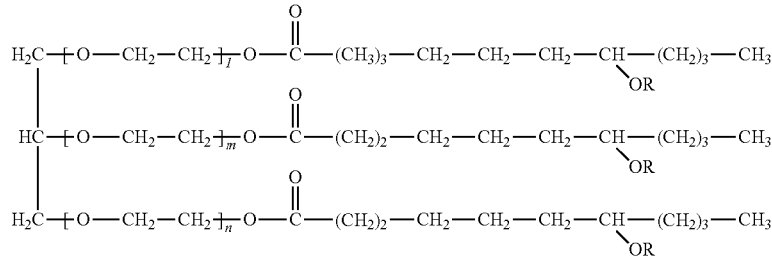

where l, m, and n are the average number of polyethylene glycol (PEG) units ranging from 1 to 100. In a preferred embodiment the PEG modified castor oil includes 10 to 60 or more moles PEG preferable 20-60 moles.

In such compositions the pendent alkyl siloxane may be present in the solution from about 0.01 wt. % to about 10 wt. %, from about 0.02 wt. % to about 7 wt. %, or from about 0.05 wt. % to about 5 wt. %. The PEG modified castor oil may be present in the solution from about 0.05 wt. % to about 10 wt. %, from about 0.1 wt. % to about 7 wt. %, or from about 0.2 wt. % to about 5 wt. %.

Additional Surfactant and Surfactant System

In some embodiments, the compositions may include an additional surfactant. Additional surfactants can be anionic, nonionic, cationic zwitterionic and can also include additional extended chain surfactant as discussed herein.

The cleaning composition can contain an additional anionic surfactant component that includes a detersive amount of an anionic surfactant or a mixture of anionic surfactants. Anionic surfactants are desirable in cleaning compositions because of their wetting and detersive properties. The anionic surfactants that can be used according to the disclosure include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate.

Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium $C_{14}$-$C_{17}$ secondary alkyl sulfonate commercially available as Hostapur SAS from Clariant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauryl ether sulfate and is available under the name Steol CS-460.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

The anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, a suitable mixture of alkaline metal salt can be sodium and magnesium, and the molar ratio of sodium to magnesium can be between about 3:1 and about 1:1.

The cleaning composition, when provided as a concentrate, can include the additional anionic surfactant component in an amount sufficient to provide a use composition having desired wetting and detersive properties after dilution with water. The concentrate can contain about 0.1 wt. % to about 0.5 wt. %, about 0.1 wt. % to about 1.0 wt. %, about 1.0 wt. % to about 5 wt. %, about 5 wt. % to about 10 wt. %, about 10 wt. % to about 20 wt. %, 30 wt. %, about 0.5 wt. % to about 25 wt. %, and about 1 wt. % to about 15 wt. %, and similar intermediate concentrations of the anionic surfactant.

The cleaning composition can contain a nonionic surfactant component that includes a detersive amount of nonionic surfactant or a mixture of nonionic surfactants. Nonionic surfactants can be included in the cleaning composition to enhance grease removal properties. Although the surfactant component can include a nonionic surfactant component, it should be understood that the nonionic surfactant component can be excluded from the detergent composition.

Additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt. %.

Other nonionic surfactants include alcohol alkoxylates. A suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

When nonionic surfactants are included in the composition concentrate, they can be included in an amount of at least about 0.1 wt. % and can be included in an amount of up to about 15 wt. %. The concentrate can include about 0.1 to 1.0 wt. %, about 0.5 wt. % to about 12 wt. % or about 2 wt. % to about 10 wt. % of the nonionic surfactant.

Amphoteric surfactants can also be used to provide desired detersive properties. Suitable amphoteric surfactants that can be used include, but are not limited to, betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the composition includes an amphoteric surfactant, the amphoteric surfactant can be included in an amount of about 0.1 wt. % to about 15 wt. %. The concentrate can include about 0.1 wt. % to about 1.0 wt. %, 0.5 wt. % to about 12 wt. % or about 2 wt. % to about 10 wt. % of the amphoteric surfactant.

The cleaning composition can contain a cationic surfactant component that includes a detersive amount of cationic surfactant or a mixture of cationic surfactants. Cationic co-surfactants that can be used in the cleaning composition include, but are not limited to: amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride.

In some embodiments the additional surfactant may be an extended surfactant. Extended surfactants include a linker polyalkylene glycol link.

The general formula for a nonionic extended surfactant is

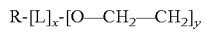

R-[L]$_x$-[O—CH$_2$—CH$_2$]$_y$ where R is the lipophilic moiety, such as a linear or branched, saturated or unsaturated, substituted or unsubstituted, aliphatic or aromatic hydrocarbon radical having from about 8 to 20 carbon atoms, L is a linking group, such as a block of poly-alkylene oxide, preferably polypropylene oxide; x is the chain length of the linking group ranging from 2-25; and y is the average degree of ethoxylation ranging from 1-18. In a preferred embodiment, applicants have found that use of a nonionic surfactant with enough PO extension as the main surfactant (and only) can form liquid single phase microemulsions. PO length is optimized at from about 5 to about 8 moles of PO. This length of PO extension provides a lower foam profile. Applicants have further found that R groups that are a branched hydrophobe such as a guerbet alcohol are better for protein soil defoaming.

Preferred extended surfactants include: branched Guerbet alcohol alkoxylates; such as C$_y$(PO)$_8$(EO)$_x$ (x=3,6,8,10) (y=10-12) also, extended linear alcohol alkoxylates; C$_{(12-14)}$(PO)$_{16}$(EO)$_x$ (x=6,12,17).

Branched Alcohol Alkoxylates

Preferred branched alcohol alkoxylates include Guerbet ethoxylates. Guerbet ethoxylates suitable for use herein have the following formula:

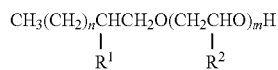

CH$_3$(CH$_2$)$_n$CHCH$_2$O(CH$_2$CHO)$_m$H
              |              |
              R$^1$         R$^2$

In an embodiment the Guerbet ethoxylate is further defined wherein R$^1$ is C2-C20 alkyl and R$^2$ is H or C1-C4 alkyl. In a further embodiment, the Guerbet ethoxylate is defined wherein "n" is an integer between 2 and 20 and wherein "m" is an integer between 1 and 40.

In another embodiment, the branched alcohol alkoxylate is a Guerbet ethoxylate that is prepared from a Guerbet alcohol by dimerization of alkenes (e.g. butane).

The branched alcohol alkoxylates, including Guerbet ethoxylates, can be prepared according to U.S. Pat. Nos. 6,906,320, 6,737,553 and 5,977,048, the disclosure of these patents are herein incorporated by reference in their entirety. Exemplary branched alcohol alkoxylates include those available under the tradenames Lutensol XP-30 and Lutensol XP-50 (BASF Corporation). In general, Lutensol XP-30 can be considered to have 3 repeating ethoxy groups, and Lutensol XP-50 can be considered to have 5 repeating ethoxy groups.

Branched alcohol alkoxylates can be classified as relatively water insoluble or relatively water soluble. In general, a water insoluble branched alcohol alkoxylate can be considered an alkoxylate that, when provided as a composition containing 5 wt.-% of the branched alcohol alkoxylate and 95 wt.-% water, has a tendency to phase separate. Lutensol XP-30 and Lutensol XP-50 from BASF Corporation are examples of water-insoluble branched alcohol alkoxylates.

According to an embodiment, a branched alcohol alkoxylate, preferably a water-insoluble Guerbet ethoxylate has from about 10 wt.-% to about 90 wt.-% ethylene oxide, from about 20 wt.-% to about 70 wt.-% ethylene oxide preferably from about 30 wt.-% to about 60 wt.-% ethylene oxide.

Applicants have further found that use of capped extended nonionic surfactants lowers the foam profile of the composition and foam from protein soil.

Capped extended nonionic surfactants can include:

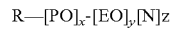

R—[PO]$_x$-[EO]$_y$[N]z

Where N is a capping group such as an alkyl group such as methyl, benzyl, butyl, etc.; a PO group of from 1-5 length, in length. These capped nonionic surfactants have lowered foam profiles and the like are effective for rinse aid formulations and detergents.

These extended chain surfactants attain low tension and/or high solubilization, and can from a single phase microemulsion with oils, such as non-trans fats with additional beneficial properties including, but not necessarily limited to, tunability to temperature and irreversibility within the microemulsion forming temperature range. For example, in one embodiment the emulsions or microemulsions may function over a relatively wide temperature range of from about 80° to 190° C. For example with a PO length of 8, and R as a Guerbet alcohol, extended nonionic surfactants tested formed stable microemulsions for 3EO at 90°-80°; 6 EO at 160°-120°; 8EO 150°-185° and 10 EO 165°-190°. Thus one can customize the extended nonionic surfactant for the type of cleaning system used, and at what temperature one wants the micro emulsion to form.

Many extended chain anionic and nonionic surfactants are commercially available from a number of sources. These include the Plurafac and Lutensol XL series from BASF, Ecosurf series from Dow, X LA series from Huntsman, and Alfotera series from Sasol.

Builders

The cleaning compositions of the present disclosure may comprise one or more detergent builders or builder systems. When a builder is used, the subject composition will typically comprise at least about 1%, from about 5% to about 60% or even from about 10% to about 40% builder by weight of the subject composition. The detergent may contain an inorganic or organic detergent builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKA-LAN® by BASF. Generally, the builder may be up to 30%, or from about 1% to about 20%, or from about 3% to about 10%.

The compositions may also contain from about 0.01% to about 10%, or from about 2% to about 7%, or from about 3% to about 5% of a C8-20 fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated C12 fatty acid, saturated C12-14 fatty acids, saturated or unsaturated C12-18 fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Dye Transfer Inhibiting Agents

The cleaning compositions of the present disclosure may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Optical Brightener

In some embodiments, an optical brightener component, may be present in the compositions of the present disclosure. The optical brightener can include any brightener that is capable of eliminating graying and yellowing of fabrics. Typically, these substances attach to the fibers and bring about a brightening and simulated bleaching action by converting invisible ultraviolet radiation into visible longer-wave length light, the ultraviolet light absorbed from sunlight being irradiated as a pale bluish fluorescence and, together with the yellow shade of the grayed or yellowed laundry, producing pure white.

Fluorescent compounds belonging to the optical brightener family are typically aromatic or aromatic heterocyclic materials often containing condensed ring systems. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.).

Optical brighteners useful in the present disclosure are known and commercially available. Commercial optical brighteners which may be useful in the present disclosure can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents.

Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present disclosure include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene. In an embodiment, optical brighteners include stilbene derivatives.

In some embodiments, the optical brightener includes Tinopal UNPA, which is commercially available through the Ciba Geigy Corporation located in Switzerland.

Additional optical brighteners for use in the present disclosure include, but are not limited to, the classes of substance of 4,4'-diamino-2,2'-stilbenedisulfonic acids (flavonic acids), 4,4'-distyrylbiphenyls, methylumbelliferones, coumarins, dihydroquinolinones, 1,3-diarylpyrazolines, naphthalimides, benzoxazol, benzisoxazol and benzimidazol systems, and pyrene derivatives substituted by heterocycles, and the like. Suitable optical brightener levels include lower levels of from about 0.01, from about 0.05, from about 0.1 or even from about 0.2 wt % to upper levels of 0.5 or even 0.75 wt %.

Dispersants

The compositions of the present disclosure can also contain dispersants. Suitable water-soluble organic materials include the homo- or co-polymeric acids or their salts, in which the polycarboxylic acid comprises at least two carboxyl radicals separated from each other by not more than two carbon atoms.

Enzymes

The cleaning compositions can comprise one or more enzymes which provide cleaning performance and/or fabric care benefits. Enzymes can be included herein for a wide variety of fabric laundering purposes, including removal of protein-based, carbohydrate-based, or triglyceride-based stains, for example, and/or for fabric restoration. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active detergents, chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the detergent. Stated another way, the detergent herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of detergent. Proteases useful herein include those like subtilisins from *Bacillus* [e.g. *subtilis, lentus, licheniformis, amyloliquefaciens* (BPN, BPN'), *alcalophilus*,] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB Pat. #1 296 839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by *Humicola insolens*, particularly DSM 1800, e.g. 50 kD and ~43 kD (Carezyyme®). Additional suitable cellulases are the EGIII cellulases from *Trichoderma longibrachiatum*. WO 02/099091 by Novozymes describes an enzyme exhibiting endo-beta-glucanase activity (EC 3.2.1.4) endogenous to *Bacillus* sp., DSM 12648; for use in detergent and textile applications; and an anti-redeposition endo-glucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM S237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endo-glucanases for an alkaline environment. Such endo-glucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from *Paenibacillus polymyxa* (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663). Bleaching enzymes useful herein with enhancers include e.g. peroxidases, laccases, oxygenases, lipoxygenase (see, e.g., WO 95/26393), and/or (non-heme) haloperoxidases.

Suitable endoglucanases include: 1) An enzyme exhibiting endo-beta-1,4-glucanase activity (E.C. 3.2.1.4), with a sequence at least 90%, or at least 94%, or at least 97% or at least 99%, or 100% identity to the amino acid sequence of positions 1-773 of SEQ ID NO:2 in WO 02/099091; or a fragment thereof that has endo-beta-1,4-glucanase activity. GAP in the GCG program determines identity using a GAP creation penalty of 3.0 and GAP extension penalty of 0.1. See WO 02/099091 by Novozymes A/S on Dec. 12, 2002, e.g., Celluclean™ by Novozymes A/S. GCG refers to sequence analysis software package (Accelrys, San Diego, Calif., USA). GCG includes a program called GAP which uses the Needleman and Wunsch algorithm to find the alignment of two complete sequences that maximizes the number of matches and minimizes the number of gaps; and 2) Alkaline endoglucanase enzymes described in EP 1 350 843A published by Kao on Oct. 8, 2003 ([0011]-[0039] and examples 1-4).

Suitable lipases include those produced by *Pseudomonas* and Chromobacter, and LIPOLASER, LIPOLASE ULTRAR, LIPOPRIMER and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amano". Other commercial lipases include Amano-CES, lipases ex Chromobacter *viscosum*, available from Toyo Jozo Co., Tagata, Japan; and Chromobacter *viscosum* lipases from U.S. Biochemical Corp., U.S.A. and Diosynth Co., The Netherlands, and lipases ex *Pseudomonas gladioli*. Also suitable are cutinases [EC 3.1.1.50] and esterases.

Enzymes useful for liquid detergent formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers

Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyamide oligomer, glycolic acid or its salts; poly hexa methylene bi guanide or N,N-bis-3-aminopropyl-dodecyl amine or salt; and mixtures thereof. The detergent may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes

Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands (MRL). As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2] hexadecane.

Suitable transition metal MRLs are readily prepared by known procedures, such as taught for example in WO 00/32601, and U.S. Pat. No. 6,225,464.

Solvents

Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally friendly solvents and mixtures thereof. In some embodiments, the solvent includes water. The water can include water from any source including deionized water, tap water, softened water, and combinations thereof. Solvents are typically present at from about 0.1% to about 50%, or from about 0.5% to about 35%, or from about 1% to about 15% by weight.

PREFERRED EMBODIMENTS

In some embodiments, the composition includes less than about 10%, less than about 5% or less than about 1% any additional surfactant. The use of additional surfactant may be limited because the selected foaming compositions are capable of producing and maintaining foam without needing help from additional surfactants.

In some embodiments, the composition includes less than about 10%, less than about 5%, less than about 1% any additional silicone materials, or be substantially free of additional silicone materials.

In some embodiments, the composition includes less than about 10%, less than about 5% or less than about 1% any foam stabilizers.

In some embodiments, the composition may be free or substantially free of additional surfactant, additional silicone material, or foam stabilizer.

Form of the Compositions

The detergent compositions may be of any suitable form, including paste, liquid, solid (such as tablets, powder/granules), foam or gel, with powders and tablets being preferred. The composition may be in the form of a unit dose product, i.e. a form which is designed to be used as a single portion of detergent composition in a washing operation. Of course, one or more of such single portions may be used in a cleaning operation.

Solid forms include, for example, in the form of a tablet, rod, ball or lozenge. The composition may be a particulate form, loose or pressed to shape or may be formed by injection moulding or by casting or by extrusion. The composition may be encased in a water-soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a molded casing (such as an injection molded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is preferably an aqueous composition although any suitable solvent may be used. According to an especially preferred embodiment of the present disclosure the composition is in the form of a tablet, most especially a tablet made from compressed particulate material.

If the compositions are in the form of a viscous liquid or gel, they preferably have a viscosity of at least 50 mPas when measured with a Brookfield RV Viscometer at 25° C. with Spindle 1 at 30 rpm.

The compositions of the disclosure will typically be used by placing them in a detergent dispenser e.g. in a dishwasher machine draw or free-standing dispensing device in an automatic dishwashing machine. However, if the composition is in the form of a foam, liquid or gel then it may be applied to by any additional suitable means into the dishwashing machine, for example by a trigger spray, squeeze bottle or an aerosol.

Processes of Making Cleaning Compositions

The compositions of the disclosure may be made by any suitable method depending upon their format. Suitable manufacturing methods for detergent compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming detergent compositions in solid forms are also well known in the art, for example, detergent tablets may be made by compacting granular/particular material and may be used herein.

In one aspect, the liquid detergent compositions disclosed herein may be prepared by combining the components thereof in any convenient order and by mixing, e.g., agitating, the resulting component combination to form a phase stable liquid detergent composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

This more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. All references cited herein are hereby incorporated in their entirety by reference.

Hand Sanitizers Employing a Siloxane Foaming Composition

In another embodiment the foaming compositions are used in alcohol based hand sanitizers. The liquid alcohol sanitizing product may be in the form of a water thin liquid, gel, emulsion, non-aerosol or aerosol foam. In a preferred embodiment, the product is in the form of a non-aerosol foam. The compositions may include other ingredients, such as an emollient or emollient system, skin conditioners, carriers, and other functional ingredients.

Foaming Agent

The hand sanitizer compositions may comprise of the structured siloxanes of the disclosure. Compared to traditional silicone surfactants the structured siloxanes do not stabilize the alcohol/water mixture foam as long, and may be preferable over the traditional silicone surfactants which may produce too persistent a foam. Traditional silicone based surfactants, which are soluble in water, typically use shorter chains of PEG, such as PEG 8-12. The structured siloxanes can be present in the alcohol composition from about 0.5 to about 10 wt. %, from about 1.0 to about 7 wt. % and from about 2 to about 5 wt. %.

Emollients

Emollients may be categorized into three different categories based on their spreading values: high, medium, and low spreading emollients. Various combinations of compounds from the different categories can create different skin feel and residue. Preferably, the ratio of about 3:1 to about 1:3 high spreading emollient to medium spreading emollient is employed.

High spreading emollients include materials with spreading values of 1000 $mm^2/10$ min. These materials also may include polymers such as dimethyl siloxanes with viscosities less than 10 centistokes (cst). Examples of high spreading oils include but are not limited to dicaprylyl carbonate, dibutyl adipate, hexyl laurate, dicaprylyl ether, propylheptyl caprylate, 4-10 centistoke silicone oil, D4, 5, or 6 cyclic siloxane, isocetyl palmitate, hydrogenated polyisobutene, and diethylhexylcarbonate. High spreading emollients may be from about 0.05 wt. % to about 1.5 wt. %, more preferably from about 0.1 wt. % to about 0.5 wt. %.

Medium spreading emollients include materials with spreading values of ≥500 $mm^2/10$ min and <1000 $mm^2/10$ min. These materials also may include polymers such as dimethyl siloxanes with viscosities between 10 cst and 100 cst. Examples of medium spreading oils include but are not limited to capric/caprylic triglyceride, C12-15 alkyl benzoate, capric triglyceride, caprylic triglyceride, isopropyl myristrate, isopropyl palmitate, octyldodecanol, decyl oleate, cocoglycerides, ethylhexyl stearate, cetearyl isononanoate, cetearyl ethyhexanonate, decyl cocoate, cetyl dimethicone, ethylhexyl palmitate, PPG-11 stearyl ether, PPG-15 stearyl ether, Dimethicone fluid (10-20 cst), and PPG-14 butyl ether. Medium spreading emollients may be from about 0.05 wt. % to about 1.5 wt. %, more preferably from about 0.1 wt. % to about 0.5 wt. %.

Low spreading emollients include spreading values of <500 $mm^2/10$ min and any material oil or waxy material with a melting point greater than 20° C. These materials also may include polymers such as siloxanes with viscosities greater than 100 cst. Low spreading emollients include mono-, di-, and tri-glycerides and butters and hydrogenated versions of seed and nut oils including but not limited to; palm oil, coconut oil, vegetable oil, avocado oil, canola oil, corn oil, soy bean oil, sunflower oil, safflower oil, meadow-foam seed oil, bilberry sead oil, watermelon seed oil, olive oil, cranberry, macadamia nut oil, argan oil, pomegranate oil, argan moraccan oil, blue berry oil, raspberry oil, walnut oil, pecan oil, peanut oil, bayberry oil, mango seed oil, Marula oil, castor oil: Shea butter, jojoba oil, hydrolyzed jojoba oil, Carnauba butter, Carnauba wax, castor isostearate succinate stearyl heptanoate, cetyl ricinoleate, oleyl frucate, sucrose monostearate, sucrose distearate, sucrose tristearate, sucrose tetrasterate, candela wax, soybean wax, Rapeseed wax, palm wax, bees wax, petrolatum, myristyl myristate, Oleyl Erucate, squalane, stearyl alcohol, Cetearyl isononanoate, polyisobutene, glyceryl stearate, glyceryl distearate, cetyl alcohol, lanolin, lanolin ethoxylate, low molecular weight polyethylene waxes, lower molecular weight polypropylene waxes, PEG-30 glyceryl cocoate, PEG-80 Glyceryl cocoate, PEG-30 Glyceryl stearate, PEG-8 Ricinoleate, PEG-8 Raspberriate, Linear (otherwise known as bis) and Pendent versions of including hydroxyl terminated and methyl ether terminated; PEG-3 to PEG-32 Dimethicone (including but not limited to: PEG-3 Dimethicone, PEG-8 Dimethicone, PEG-9 Dimethicone, PEG-10 Dimethicone, PEG-11 Methyl ether dimethicone, PEG-12 Dimethicone, PEG-14 Dimethicone, PEG-17 Dimethicone, PEG-32 Dimethicone), bis-PEG/PPG-20/20 Dimethicone, PEG/PPG 20/23 Dimethicone, PEG/PPG 20/22 Butyl Ether Dimethicone, PEG/PPG 23/6 Dimethicone, PEG/PPG 20/15 Dimethicone.

Alkyl modified dimethicone (stearoxy dimethicone, behenoxy dimethicone, cetyl dimethicone, certeryl methicone C30-45 Alkyl cetearyl dimethicone copolymer, C30-45 Alkyl dimethicone, caprylyl methicone, PEG-8 dimethicone/dimer dilinoleic acid copolymer, Bis-PEG-10 Dimethicone/Dimer Dilinoleate Copolymer, Stearoxymethicone/ Dimethicone Copolymer, Dipheyl dimethicone, Lauryl polyglycerol-3 polydimethylsiloxyethyl dimethicone, Lauryl PEG-9 polydimethylsiloxyethyl dimethicone), Dimethicone fluid (>20 cst), quaternized ammonia silicone polymers, Amino silicones, silicone quaternium-18, Amodimethicone, phenyltrimethicone, amino silicone polyethers, Polyglycerol-3 Disiloxane dimethicone, Polyglycerol-3 polydimethylsiloxyethyl dimethicone, and PEG-9 polydimethylsiloxyethyl dimethicone. Low spreading emollients may be from about 0.1 wt. % to about 1.5 wt. %, more preferably from about 0.25 wt. % to about 1 wt. %.

Skin Conditioner

The composition can include at least one additional skin conditioner such as vitamins, a humectant, an occlusive agent, or other moisturizer to provide skin moisturizing, skin softening, skin barrier maintenance, anti-irritation, or other skin health benefits. Some non-limiting examples of additional skin conditioners include alkyl benzoate, myristyl myristate, cetyl myristate, gelatin, carboxylic acid, glyceryl dioleate, methyl laurate, PPG-9 laurate, lauryl lactylate, allantoin, octyl palmitate, lanolin, propylene glycol, butylene glycol, ethylene glycol, caprylyl glycol, monobutyl ether, glycerine, fatty acids, proline, natural oils such as almond, mineral, canola, sesame, soybean, pyrrolidine, wheat germ, hydrolyzed wheat protein, hydrolyzed oat protein, hydrolyzed collagen, corn, peanut and olive oil, isopropyl myristate, myristyl alcohol, aloe vera, algae extract, gluconic acid, hydrolyzed silk protein, 1,3-propane-diol, Vitamin E, nicotinamide, stearyl alcohol, isopropyl palmitate, sorbitol, amino acid complexes, panthenol, allantoin, Dihydroxypropyltrimonium Chloride, quaternized hydrolyzed protein such as collagen, oat, wheat, etc., inositol, fructose, sucrose, hydrolyzed plant proteins, seaweed extract, polyethylene glycol, ammonium lactate, sodium hyaluronate, and cyclic peptides.

Some non-limiting examples of humectants include hydroxyethyl urea, agarose, urea, sodium PCA, arginine PCA, fructose, glucose, glutamic acid, glycerine, honey, lactose, maltose, polyethylene glycol, sorbitol and mixtures thereof.

Some non-limiting examples of occlusive agents include petrolatum, shea butter, avocado oil, balm mint oil, cod liver oil, mineral oil, trimyristin, stearyl stearate, synthetic wax, or mixtures thereof. Some non-limiting examples of other moisturizers include ethyl hexylglycerin, cholesterol, cystine, hyaluronic acid, keratin, lecithin, egg yolk, glycine, PPG-12, polyquaternium polymers such as polyquaternium-11, behentrimonium chloride, dihydroxypropyl PEG-5 linoleammonium chloride, glycerol oleate, PEG-7 glyceryl cocoate, cocoglucoside, PEG-200 hydrogenated glyceryl palmate, panthenol, retinol, salicylic acid, vegetable oil, methyl gluceth-10, methyl gluceth-20, ethoxylated derivatives of skin conditioners such as glycereth-26 and ethoxylated shea butter, and mixtures thereof. Finally, some non-limiting examples of anti-irritants include bisabolol and panthenol.

The skin conditioner or combination thereof in total is present in the composition in chronic use is in an amount from about 0.01 wt. % to about 3 wt. %, preferably from about 0.05 wt. % to about 2 wt. %, and more preferably from about 0.1 wt. % to about 1 wt. %. Each individual skin conditioner is present in an amount of no more than 0.5 wt. % to facilitate the skin health for chronic use and best feel characteristics.

Carrier

In some embodiments that composition is water free. In some embodiments there may be a carrier in the present composition, preferably water. It should be appreciated that the water may be provided as deionized water or as softened water. The water provided as part of the concentrate can be relatively free of hardness. It is expected that the water can be deionized to remove a portion of the dissolved solids. That is, the concentrate can be formulated with water that includes dissolved solids and can be formulated with water that can be characterized as hard water. The amount of water will vary based upon the particular form of the composition, water thin liquid, gel, emulsion, aerosol foam, or non-aerosol foaming cleanser.

Additional Functional Ingredients

Additional functional ingredients may be used to improve the effectiveness of the composition. Some non-limiting examples of such additional functional ingredients include skin feel improvers, skin conditioners, surfactants pH adjusting compound, preservatives, antioxidants, fragrances, dyes, and the like, as well as mixtures thereof.

Terpenoid

The composition may optionally include a terpenoid. Terpenoids are defined as materials with molecular structures containing carbon backbones made up of isoprene (2-methylbuta-1,3-diene) units. Isoprene contains five carbon atoms and therefore, the number of carbon atoms in any terpenoid is a multiple of five. It is believed that terpenoids assist in promoting the uptake of antimicrobial compounds and preservatives by cells of bacteria and fungi, thereby increasing the efficacy of the antimicrobial compound or preservative. See U.S. Pat. No. 6,319,958 and DE 195 23 320 which are incorporated by reference in their entirety. Some non-limiting examples of terpenoids include α-terpinene, cineole, citral, citronellal, citronellol, farnesol, geraniol, limonene, linalool, methone, nerolidol, terpineol, camphene, menthone, myrcene, nerol, tetrahydrogeraniol, tetrahydrolinalool, apritone, and bisabolol. The terpenoid is preferably farnesol, nerolidol, bisabolol, or apritone.

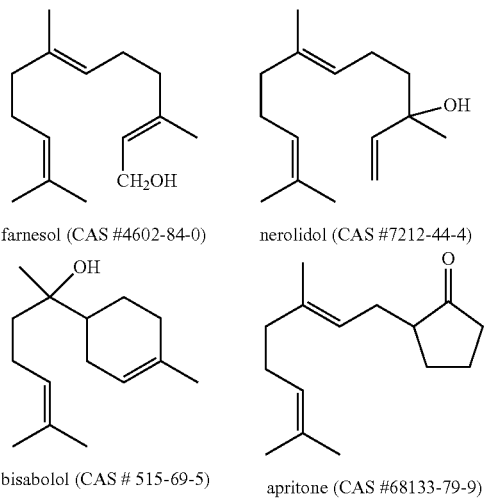

farnesol (CAS #4602-84-0)   nerolidol (CAS #7212-44-4)

bisabolol (CAS # 515-69-5)   apritone (CAS #68133-79-9)

The terpenoid is preferably present in the composition in an amount from about 0 to about 1 wt. %, from about 0 to about 0.5 wt. %, and from about 0 to about 0.3 wt. %.

Chelating Agent

The composition may optionally include a chelating agent. Examples of chelating agents include phosphonic acid and phosphonates, phosphates, aminocarboxylates and their derivatives, pyrophosphates, ethylenediamine and ethylenetriamine derivatives, hydroxyacids, and mono-, di-, and tri-carboxylates and their corresponding acids. Other chelating agents include nitroloacetates and their derivatives, and mixtures thereof. Examples of aminocarboxylates include amino acetates and salts thereof. Suitable amino acetates include: N-hydroxyethylaminodiacetic acid; hydroxyethylenediaminetetraacetic acid; nitrilotriacetic acid (NTA); ethylenediaminetetraacetic acid (EDTA); N-hydroxyethyl-ethylenediaminetriacetic acid (HEDTA); tetrasodium ethylenediaminetetraacetic acid (EDTA); diethylenetriaminepentaacetic acid (DTPA); and alanine-N,N-diacetic acid; n-hydroxyethyliminodiacetic acid; and the like; their alkali metal salts; and mixtures thereof. Suitable aminophosphates include nitrilotrismethylene phosphates and other aminophosphates with alkyl or alkaline groups with less than 8 carbon atoms. Exemplary polycarboxylates iminodisuccinic acids (IDS), sodium polyacrylates, citric acid, gluconic acid, oxalic acid, salts thereof, mixtures thereof, and the like. Additional polycarboxylates include citric or citrate-type chelating agents, polymeric polycarboxylate, and acrylic or polyacrylic acid-type chelating agents. Additional chelating agents include polyaspartic acid or co-condensates of aspartic acid with other amino acids, C4-C25-mono-or-dicarboxylic acids and C4-C25-mono-or-diamines. Exemplary polymeric polycarboxylates include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

The chelating agent may be present in an amount from about 0 to about 5 wt. %, from about 0 to about 3 wt. %, and from about 0 to about 1.5 wt. %.

Preservatives

The composition may optionally include a preservative. Generally, preservatives fall into specific classes including phenolics, halogen compounds, quaternary ammonium compounds, metal derivatives, amines, alkanolamines, nitro derivatives, biguanides, analides, organosulfur and sulfur-nitrogen compounds, alkyl parabens, and miscellaneous compounds. Some non-limiting examples of phenolic antimicrobial agents include pentachlorophenol, orthophenylphenol, chloroxylenol, p-chloro-m-cresol, p-chlorophenol, chlorothymol, m-cresol, o-cresol, p-cresol, isopropyl cresols, mixed cresols, phenoxyethanol, phenoxyethylparaben, phenoxyisopropanol, phenyl paraben, resorcinol, and derivatives thereof. Some non-limiting examples of halogen compounds include trichlorohydroxy diphenyl ether (Triclosan), sodium trichloroisocyanurate, sodium dichloroisocyanurate, iodine-poly(vinylpyrolidin-onen) complexes, and bromine compounds such as 2-bromo-2-nitropropane-1,3-diol, and derivatives thereof. Some non-limiting examples of quaternary ammonium compounds include benzalkonium chloride, benzethonium chloride, behentrimonium chloride, cetrimonium chloride, and derivatives thereof. Some non-limiting examples of amines and nitro containing compounds include hexahydro-1,3,5-tris(2-hydroxyethyl)-s-triazine, dithiocarbamates such as sodium dimethyldithiocarbamate, and derivatives thereof. Some non-limiting examples of biguanides include polyaminopropyl biguanide and chlorhexidine gluconate. Some non-limiting examples of alkyl parabens include methyl, ethyl, propyl and butyl parabens. The preservative is preferably present in the composition in an amount from about 0 to about 3 wt. %, from about 0.1 to about 2 wt. %, and from about 0.2 to about 1 wt. %.

Thickener

The composition may optionally include a thickener. Exemplary thickeners include (1) cellulosic thickeners and their derivatives, (2) natural gums, (3) starches, (4) stearates, and (5) fatty acid alcohols, (6) acrylic acid polymers and crosspolymers (example "carbomer", (7) Aristoflex AVC (need generic category name0 Some non-limiting examples of cellulosic thickeners include carboxymethyl hydroxyethylcellulose, cellulose, hydroxybutyl methylcellulose, hydroxyethylcellulose, hydroxypropylcellulose, hydroxypropyl methyl cellulose, methylcellulose, microcrystalline cellulose, sodium cellulose sulfate, and the like. Some non-limiting examples of natural gums include acacia, calcium carrageenan, guar, gelatin, guar gum, hydroxypropyl guar, karaya gum, kelp, locust bean gum, pectin, sodium carrageenan, tragacanth gum, xanthan gum, and the like. Some non-limiting examples of starches include oat flour, potato starch, wheat flour, wheat starch, and the like. Some non-limiting examples of stearates include PEG-150 distearate, methoxy PEG-22/dodecyl glycol copolymer, and the like. Some non-limiting examples of fatty acid alcohols include caprylic alcohol, cetearyl alcohol, lauryl alcohol, oleyl alcohol, palm kernel alcohol, and the like.

The amount of thickener in the composition depends on the desired viscosity of the composition. The composition preferably has a viscosity low enough to pump through a foamer such as an Airspray foamer and allow foaming.

Other Surfactants

The composition may optionally contain a surfactant or surfactant mixture. These can be selected from water soluble or water dispersible nonionic, semi-polar nonionic, anionic, cationic, amphoteric, or zwitterionic surface-active agents; or any combination thereof. The particular surfactant or surfactant mixture chosen for use in the process and products described herein can depend on the conditions of final utility, including method of manufacture, physical product form, use pH, and the like.

A typical listing of the classes and species of surfactants useful herein appears in U.S. Pat. No. 3,664,961 issued May 23, 1972, to Norris. The disclosure of which is hereby incorporated by reference. Additional surfactants, if present may be in the amount of from 0.5 to about 10 wt. %, from about 1.0 to about 7 wt. %, from about 2 to about 5 wt. %, or less than 2 wt. %, less than 5 wt. %, or less than about 10 wt. %.

Skin Feel Improver

The composition may optionally include a skin feel improver for enhancing the "feel" of the composition on a user's skin or hands. For example, it may be undesirable for a composition to have a scaly or gritty texture when applied to a user's skin or after the multiple applications of the composition. Some non-limiting examples of skin feel improvers include silicone copolymers such as amodimethicone, cyclomethicone, bis-PEG/PPG-20/20 dimethicone, and stearoxytrimethylsilane, naturally occurring or synthetic fatty acid esters or ethers, and polyalkylene glycols.

If a skin feel improver is included, it is preferably present in the composition in an amount from about 0.001 to about 5 wt. %, from about 0.01 to about 3 wt. %, and from about 0.1 to about 2 wt. %.

pH-Adjusting Compound

Sanitizer compositions described herein have a pH of about 4.0 to about 8. Within this pH range, the present compositions effectively reduce microbial populations, and are consumer acceptable, i.e., are mild to the skin, are phase stable, and generate copious, stable foam. In some instances a pH adjusting compound may be necessary in a sufficient amount to provide a desired composition pH. To achieve the full advantage of the disclosed compositions, the pH-adjusting compound is present in an amount of about 0.05% to about 3.5%, by weight.

Examples of basic pH-adjusting compounds include, but are not limited to, ammonia; mono-, di-, and trialkyl amines; mono-, di-, and trialkanolamines; alkali metal and alkaline earth metal hydroxides; alkali metal phosphates; alkali sulfates; alkali metal carbonates; and mixtures thereof. However, the identity of the basic pH adjuster is not limited, and any basic pH-adjusting compound known in the art can be used. Specific, nonlimiting examples of basic pH-adjusting compounds are ammonia; sodium, potassium, and lithium hydroxide; sodium and potassium phosphates, including hydrogen and dihydrogen phosphates; sodium and potassium carbonate and bicarbonate; sodium and potassium sulfate and bisulfate; monoethanolamine; trimethylamine; isopropanolamine; diethanolamine; and triethanolamine.

The identity of an acidic pH-adjusting compound is not limited and any acidic pH-adjusting compound known in the art, alone or in combination, can be used. Examples of specific acidic pH-adjusting compounds are the mineral acids and polycarboxylic acids. Nonlimiting examples of mineral acids are hydrochloric acid, nitric acid, phosphoric acid, and sulfuric acid. Nonlimiting examples of polycarboxylic acids are citric acid, glycolic acid, and lactic acid.

Antioxidant

The composition may optionally include an antioxidant for improved skin condition through the removal of free radicals, and improved product stability. Some non-limiting examples of antioxidants include retinol and retinol derivatives, ascorbic acid and ascorbic acid derivatives, BHA, BHT, betacarotene, cysteine, erythorbic acid, hydroquinone, tocopherol and tocopherol derivatives, and the like.

If an antioxidant is included, it is preferably present in the composition in an amount from about 0.001 to about 2 wt. %, from about 0.01 to about 1 wt. %, and from about 0.05 to about 0.5 wt. %.

Fragrance

The composition may optionally include a fragrance. Examples of possible fragrances include natural oils or naturally derived materials, and synthetic fragrances such as hydrocarbons, alcohols, aldehydes, ketones, esters, lactones, ethers, nitriles, and polyfunctionals. Non-limiting examples of natural oils include the following: basil (*Ocimum basilicum*) oil, bay (*Pimento acris*) oil, bee balm (*Monarda didyma*) oil, bergamot (*Citrus aurantium bergamia*) oil, cardamom (*Elettaria cardamomum*) oil, cedarwood (*Cedrus atlantica*) oil, chamomile (*Anthemis nobilis*) oil, cinnamon (*Cinnamomum cassia*) oil, citronella (*Cymbopogon nardus*) oil, clary (*Salvia sclarea*) oil, clove (*Eugenia caryophyllus*) oil, cloveleaf (*Eugenia caryophyllus*) oil, *Cyperus esculentus* oil, cypress (*Cupressus sempervirens*) oil, *Eucalyptus citriodora* oil, geranium *maculatum* oil, ginger (*Zingiber officinale*) oil, grapefruit (*Citrus grandis*) oil, hazel (*Corylus avellana*) nut oil, jasmine (*Jasminum officinale*) oil, *Juniperus communis* oil, *Juniperus oxycedrus* tar, *Juniperus virginiana* oil, kiwi (*Actinidia chinensis*) water, lavandin (*Lavandula hybrida*) oil, lavender (*Lavandula angustifolia*) oil, lavender (*Lavandula angustifolia*) water, lemon (*Citrus medica limonum*) oil, lemongrass (*Cymbopogon schoenanthus*) oil, lime (*Citrus aurantifolia*) oil, linden (*Tilia cordata*) oil, linden (*Tilia cordata*) water, mandarin orange (*Citrus nobilis*) oil, nutmeg (*Myristica fragrans*) oil, orange (*Citrus aurantium dulcis*) flower oil, orange (*Citrus aurantium dulcis*) oil, orange (*Citrus aurantium dulcis*) water, patchouli (*Pogostemon cablin*) oil, peppermint (*Menthe piperita*) oil, peppermint (*Menthe peperita*) water, rosemary (*Rosmarinus officinalis*) oil, rose oil, rose (*Rosa damascena*) extract, rose (*Rosa multiflora*) extract, rosewood (*Aniba rosaeodora*) extract, sage (*Salvia officinalis*) oil, sandalwood (*Santalum album*) oil, spearmint (*Menthe viridis*) oil, tea tree (*Melaleuca alternifolia*) oil, and ylang ylang (*Cananga odorata*) oil. Some non-limiting examples of synthetic hydrocarbon fragrances include caryophyllene, β-farnesene, limonene, α-pinene, and β-pinene. Some non-limiting examples of synthetic alcohol fragrances include bacdanol, citronellol, linalool, phenethyl alcohol, and α-terpineol (R=H). Some non-limiting examples of synthetic aldehyde fragrances include 2-methyl undecanal, citral, hexyl cinnamic aldehyde, isocycolcitral, lilial, and 10-undecenal. Some non-limiting examples of synthetic ketone fragrances include cashmeran, α-ionone, isocyclemone E, koavone, muscone, and tonalide. Some non-limiting examples of synethetic ester fragrances include benzyl acetate, 4-t-butylcyclohexyl acetate (cis and trans), cedryl acetate, cyclacet, isobornyl acetate, and α-terpinyl acetate (R=acetyl). Some non-limiting examples of synthetic lactone fragrances include coumarin, jasmine lactone, muskalactone, and peach aldehyde. Some non-limiting examples of synthetic ether fragrances include ambroxan, anther, and galaxolide. Some non-limiting examples of synthetic nitrile fragrances include cinnamonitrile and gernonitrile. Finally, some non-limiting examples of synthetic polyfunctional fragrances include amyl salicylate, isoeugenol, hedione, heliotropine, lyral, and vanillin.

The composition may include a mixture of fragrances including a mixture of natural and synthetic fragrances. The fragrance can be present in a composition in an amount up to about 5 wt. %, preferably from 0to about 3 wt. %, from about 0 to about 1 wt. %, and from about 0 to about 0.2 wt. %.

Dye

The composition may optionally include a dye. Examples of dyes include any water soluble or product soluble dye, any FD&C or D&C approved dye.

Form of the Compositions

The compositions described herein may be provided as a water thin liquid, structured liquid or emulsion. The composition is preferably provided as a ready to use composition, meaning that the composition is provided in a way that can be applied without needing to dilute it first.

Methods of Making the Compositions

The compositions described herein are easily produced by any of a number of known art techniques. Conveniently, a part of the water is supplied to a suitable mixing vessel further provided with a stirrer or agitator, and while stirring, the remaining constituents are added to the mixing vessel, including any final amount of water needed to provide to 100% wt. of the inventive composition.

The compositions may be packaged in any suitable container particularly flasks or bottles, including squeeze-type or pump bottles, as well as bottles provided with a spray apparatus (e.g. trigger spray) which is used to dispense the composition by spraying. The selected packaging may have a pump head foamer. Examples of commercially available pump head foamers include the F2 foamer from Rexam PLC (London, England, formerly Airspray), and the RF-17 Palm Foamer from Rieke Corporation (Auburn, Indiana). Accordingly the compositions are desirably provided as a ready to use product in a manually operated dispensing container.

The composition may be provided in various packaging sizes. Examples of packaging sizes include 1.5 oz, 500 ml and 1 liter bottles.

Whereas the compositions herein are intended to be used in the types of liquid forms described, nothing in this specification shall be understood as to limit the use of the composition with a further amount of water to form a solution there from. Conversely, nothing in the specification shall be also understood to limit the forming of a "super-concentrated" composition based upon the composition described above Such a super-concentrated ingredient composition is essentially the same as the compositions described above except in that they include a lesser amount of water.

Methods Employing the Sanitizing Compositions

The disclosure includes a method for reducing the population of a microorganism on skin, a method for treating a disease of skin, and the like. These methods can operate by contacting the body with a composition as described herein. Contacting can include any of numerous methods for applying a composition, such as spraying the compositions, immersing, foam or gel treating the skin with the composition, or a combination thereof.

The compositions can be included in any skin application products such, sanitizers, deodorizers, antiseptics, fungicides, germicides, virucides, waterless hand sanitizers, and pre- or post-surgical scrubs, preoperative skin preps.

This more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. All references cited herein are hereby incorporated in their entirety by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Materials used in the following Examples are provided herein:
Airase Defoamer 5100: structured siloxane, viscosity of 400-800 at cPs at 21° C., around 56 siloxane units, total PO groups of 4,000-5,500 MW
Airase Defoamer 5200: structured siloxane, viscosity of 500-900 at cPs at 21° C., around 20 siloxane units
Airase Defoamer 5300: structured siloxane, viscosity of 500-900 at cPs at 21° C., around 55 siloxane units, total PO groups of 4,000-5,500 MW
Airase Defoamer 5400: structured siloxane, viscosity of 450-900 at cPs at 21° C., around 77 siloxane units
Airase Defoamer 5500: structured siloxane, viscosity of 450-900 at cPs at 21° C., around 79 siloxane units
Airase Defoamer 5600: structured siloxane, viscosity of 200-500 at cPs at 21° C., around 18 siloxane units
Airase Defoamer 5700: structured siloxane, viscosity of 100-400 at cPs at 21° C., around 18 siloxane units
Inline Silicone Surfactant (RM #830307): traditional silicone surfactant
Silquat Di-10: di-functional water-soluble silicone quaternary compound, viscosity 700 cPs at 25° C., traditional silicone surfactant
Silsurf Di-15-I: structured siloxane, viscosity of 50-150 cPs at 25° C.
DBP-C22: hydroxyalkyl terminated poly(propleneoxy)-polydimethylsiloxane block copolymer, viscosity of 200-300 cst, MW 2,500-3,200
CMS-222: (hydroxypropyleneoxypropyl)methylsiloxane-dimethysiloxane copolymer, viscosity 150-200 cst, MW 5,500-6,500

Example 1

Structured siloxanes are not known to influence the surface tension of alcohol/water mixes but are known to be insoluble in water which leads to their defoaming properties. This is unlike traditional silicone surfactants, which contain both a hydrophilic and hydrophobic portion, which may be dissolved in water and allow it to foam.

Determining if the structured siloxanes could reduce the dynamic surface tension of the compositions found in Table were measured on a tensiometer. As shown in Table 1, not even 0.1% Sisurf Di-15-I, the exemplary structured siloxane, was able to dissolve in water, leaving tiny droplets floating around in the capillary tip of the tensiometer. However, Silsurf Di-15-I was able to reduce the surface tension in the 64.61 wt. % ethanol/water mix lower than the traditional silicone surfactant at both a 2% and 1.5% Silsurf Di-15-I concentration. This indicates that, while Silsurf Di-15-I is does not have similar properties to traditional silicone surfactants, due to its inability to dissolve in water, it may still act as a foaming agent in alcohol/water mixes.

TABLE 1

Dynamic surface tension studies

| | Dynamic surface tension |
|---|---|
| Pure water | 72.1 |
| Ethanol SDA-40B 190 proof (92.3% active) + Inline Silicone Surfactant (RM# 830256) | 22.6 |
| 70 wt. % ethanol SDA-40B | 25.2 |
| Ethanol SDA-40B + 2% Silsurf Di-15-1 | 22.3 |
| 70 wt. % ethanol SDA-40 + 1.5% Silsurf Di-15-1 | 20.9 |
| Water + 2% Silsurf Di-15-1 | Not dissolve, tiny droplets floating around capillary tip, Jumpy curve with no-repeatable results. |

TABLE 1-continued

Dynamic surface tension studies

| | Dynamic surface tension |
|---|---|
| Water + 0.1% Silsurf Di-15-1 | Not dissolve, tiny droplets floating around capillary tip, Jumpy curve with no-repeatable results. |

Example 2

Structured siloxanes are not known to be able to form a foam in solutions of an organic solvent, such as ethanol, and a polar solvent, such as water and are known for being defoaming agents. Additionally, unlike traditional silicone surfactants, structured siloxanes are not soluble in water. However, it was surprisingly found that they are not only soluble in alcohol/water solutions but may also foam the alcohol/water solutions.

In order to screen for possible foaming in a high ethanol/water solution, comprising of 90.45 wt. % ethanol, manual foam testing was conducted on structured siloxanes. To test, 20 mL of each of the compositions found in Table 1 were placed in a 1 inch by 4.5 inch glass cylinder bottle and then shaken for about 10 seconds. After shaking, several of the structured siloxanes were not completely soluble, indicated by cloudy solutions. However, among these, only Arise 5600 and CMS-222 failed to produce any foam. The other structured siloxanes showed a mixed ability to not only cause the composition to foam, but also a variability in the length at which the foam lasted, ranged from 5 seconds to 6 minutes.

Without being bound by theory, it is believed that the length of the polydimethylsilicone (PDMS) backbone is a bigger factor than the location of the propoxylation groups in about 90 wt. % ethanol mixes. The PDMS backbone cannot be too high to render the PDMS propoxylate molecules to be insoluble in the alcohol/water mixture. This can be observed when comparing Airase compounds. Airase 5100 and 5300, Examples 1 and 3 in Table 2, show the most stable foaming, whereas the foam lasted minutes instead of seconds. Airase 5100 and 5300 have about 55 siloxane units in the backbone. Airase 5200 (Example 2 in Table 2), having 20 siloxane units, when compared to Airase 5600 and Airase 5700 (Examples 6 and 7 in Table 2, respectively), both having about 18 siloxane units, show that between 18 and 20 the amount of siloxane is too low for foaming. Airase 5400 and Airase 5500 (Examples 4 and 5 respectively in Table 2), having about 78 units of siloxane, had low foam height that only lasted seconds, showing that this length is borderline high.

The size of the overall compound is further emphasized in the comparison between DBP-C22 and CMS-222 (Examples 11 and 12 in Table 2, respectively). CMS-222 is about twice the molecular weight of DBP-C22 and was unable to go into solution or foam. CMS-222 is also larger than Airase 5100 and 5300. Without being bound by theory, it is believed that the PDMS backbone cannot be too high or it may render the molecule insoluble in the ethanol/water mix so it will not be surface active. Without the surface activity, the structured siloxane can not sufficiently reduce the surface tension to make it energetically favorable to form additional surface area, and thus create foam.

Surprisingly, at this high amount of ethanol, it was found that the defoamers Airase 5100 and 5300 both outperformed the traditional silicone surfactants (Example 8 and 9 in Table 2) for both height and stability of foam.

Therefore, high ethanol mixes may be foamed using structured siloxanes without additional traditional silicone surfactants, which comprise both a hydrophobic and hydrophilic chain. Further, it appears that a wide range of sizes of the structured siloxanes may be used to foam the high ethanol mixes so the foam quality may be fine-tuned.

TABLE 2

Selected examples of Structured Siloxanes and Traditional Silicone Surfactants with Ethanol SDA-40B (92.3% active)

| | Example 1 | Example 2 | Example 3 | Example 4 | Example 5 | Example 6 |
|---|---|---|---|---|---|---|
| Airase Defoamer 5100 | 2% | | | | | |
| Airase Defoamer 5200 | | 2% | | | | |
| Airase Defoamer 5300 | | | 2% | | | |
| Airase Defoamer 5400 | | | | 2% | | |
| Airase Defoamer 5500 | | | | | 2% | |
| Airase Defoamer 5600 | | | | | | 2% |
| Airase Defoamer 5700 | | | | | | |
| Inline Silicone Surfactant (RM# 830307) | | | | | | |
| Silquat Di-10 | | | | | | |
| Silsurf Di-15-1 | | | | | | |
| DBP-C22 | | | | | | |
| CMS-222 | | | | | | |

TABLE 2-continued

Selected examples of Structured Siloxanes and Traditional Silicone Surfactants with Ethanol SDA-40B (92.3% active)

| | | | | | | |
|---|---|---|---|---|---|---|
| Ethanol SDA-40B 190 proof (92.3% active) | 98% | 98% | 98% | 98% | 98% | 98% |
| Observation | Cloudy solution, Initial foam height 15-20 mm, disappeared in 6 minutes. | Cloudy solution, Initial foam height 5-10 mm, Foam disappeared in 30 seconds. | Clear solution, Initial foam height 20 mm, Foam disappeared in 4 minutes. | Clear solution, Initial foam height 20-25 mm, Foam disappeared in 50 seconds. | Clear solution, Initial foam height 15-10 mm, Foam disappeared in 50 seconds. | No foam |

| | Example 7 | Example 8 | Example 9 | Example 10 | Example 11 | Example 12 |
|---|---|---|---|---|---|---|
| Airase Defoamer 5100 | | | | | | |
| Airase Defoamer 5200 | | | | | | |
| Airase Defoamer 5300 | | | | | | |
| Airase Defoamer 5400 | | | | | | |
| Airase Defoamer 5500 | | | | | | |
| Airase Defoamer 5600 | | | | | | |
| Airase Defoamer 5700 | 2% | | | | | |
| Inline Silicone Surfactant (RM# 830307) | | 2% | | | | |
| Silquat Di-10 | | | 2% | | | |
| Silsurf Di-15-1 | | | | 2% | | |
| DBP-C22 | | | | | 2% | |
| CMS-222 | | | | | | 2% |
| Ethanol SDA-40B 190 proof (92.3% active) | 98% | 98% | 98% | 98% | 98% | 98% |
| Observation | Clear solution, Initial foam height 5 mm, Foam disappeared in 5 seconds. | Clear solution, Initial foam height 10-5 mm, Foam disappeared in 15 seconds. | Clear solution, Initial foam height 12 mm, Foam disappeared in 10 seconds. | Clear solution, Initial foam height 10 mm, Foam disappeared in 10 seconds. | Clear solution, Initial foam height 6 mm, Foam disappeared in 10 seconds. | Cloudy solution, no foam. |

Example 3

As the structured siloxanes showed surprising results in being able to foam high ethanol mixes, a lower ethanol mix, 64.61 wt. % ethanol, was next tested. To test, 20 mL of each of the compositions found in Table 3 were placed in a 1 inch by 4.5 inch glass cylinder bottle and then shaken for about 10 seconds. Contrary to the results seen in Example 2, the 64.61 wt. % ethanol/water mix was less demanding as all the Airase Defoaming compounds were capable of foaming the ethanol/water mixes. Without being bound by theory, the higher water level allows the propoxylated groups to balance the overall solubility of the structured siloxanes better. Also contrary to the results of Example 2, the traditional silicone surfactants produced the highest foam for the longest period of time, lasting for over 30 minutes (see Example 8 in Table 3). However, while the foam was lower, Airase 5100, 5300, 5400, 5500, 5700 were all capable of creating foam for 30 minutes. Airase 5200 and 5600, along with Silsurf Di-15-I and DBP-C22 all produced foam for shorter amounts of time. This further illustrates that the properties between the structured siloxanes and traditional silicone or siloxane surfactants that are fully soluble in water are different. Similar to the results of Example 1, CMS-222 was unable to form foam and was insoluble in the mix.

The structured siloxanes also show a more varied ability to foam the ethanol/water mix. The structured siloxanes created foam from a few minutes to over half an hour. The shorter time may be desirable for uses such as, but not limited to, hand sanitizers where it may be preferable to not have the foam too persistent. Therefore, ethanol mixes may be foamed using structured siloxanes to fine tune the foaming properties of different ethanol/water mixes to achieve desired results.

TABLE 3

Selected examples of Structured Siloxanes and Traditional Silicone Surfactants with Ethanol SDA-40B (92.3% active)

| | Example 1 | Example 2 | Example 3 | Example 4 | Example 5 | Example 6 |
|---|---|---|---|---|---|---|
| Airase Defoamer 5100 | 1.5% | | | | | |
| Airase Defoamer 5200 | | 1.5% | | | | |
| Airase Defoamer 5300 | | | 1.5% | | | |
| Airase Defoamer 5400 | | | | 1.5% | | |
| Airase Defoamer 5500 | | | | | 1.5% | |
| Airase Defoamer 5600 | | | | | | 1.5% |
| Airase Defoamer 5700 | | | | | | |
| Inline Silicone Surfactant (RM# 830307) | | | | | | |
| Silquat Di-10 | | | | | | |
| Silsurf Di-15-1 | | | | | | |
| DBP-C22 | | | | | | |
| CMS-222 | | | | | | |
| Ethanol SDA-40B 190 proof (92.3% active) | 70% | 70% | 70% | 70% | 70% | 70% |
| DI Water | 28.5% | 28.5% | 28.5% | 28.5% | 28.5% | 28.5% |
| Observation | Cloudy solution, Initial foam height 15-20 mm, After 5 minutes: 10 mm, after 15 minutes: 6 mm, after 30 minutes: 5 mm | Cloudy solution, Initial foam height 15-20 mm, After 5 minutes: 5 mm, after 15 minutes: disappear | Clear solution, Initial foam height 15-20 mm, After 5 minutes: 10 mm, after 15 minutes: 8 mm, after 30 minutes: 6-5 mm | Clear solution, Initial foam height 25-30 mm, After 5 minutes: 10 mm, after 15 minutes: 8 mm, after 30 minutes: 2 mm (center area open) | Clear solution, Initial foam height 25 mm, After 5 minutes: 16 mm, after 15 minutes: 8 mm, after 30 minutes: 5 mm | Clear solution, Initial foam height 20 mm, After 2 minutes: disappear |

| | Example 7 | Example 8 | Example 9 | Example 10 | Example 11 | Example 12 |
|---|---|---|---|---|---|---|
| Airase Defoamer 5100 | | | | | | |
| Airase Defoamer 5200 | | | | | | |
| Airase Defoamer 5300 | | | | | | |
| Airase Defoamer 5400 | | | | | | |
| Airase Defoamer 5500 | | | | | | |
| Airase Defoamer 5600 | | | | | | |
| Airase Defoamer 5700 | 1.5% | | | | | |
| Inline Silicone Surfactant (RM# 830307) | | 1.5% | | | | |
| Silquat Di-10 | | | 1.5% | | | |
| Silsurf Di-15-1 | | | | 1.5% | | |
| DBP-C22 | | | | | 1.5% | |
| CMS-222 | | | | | | 1.5% |
| Ethanol SDA-40B 190 proof (92.3% active) | 70% | 70% | 70% | 70% | 70% | 70% |

TABLE 3-continued

Selected examples of Structured Siloxanes and Traditional
Silicone Surfactants with Ethanol SDA-40B (92.3% active)

| DI Water | 28.5% | 28.5% | 28.5% | 28.5% | 28.5% | 28.5% |
|---|---|---|---|---|---|---|
| Observation | Clear solution, Initial foam height 25 mm, After 5 minutes: 12 mm, after 15 minutes: 10 mm, after 30 minutes: 7 mm | Clear solution, Initial foam height 45-50 (reach the top), After 5 minutes: 35-40 mm, after 15 minutes: 35 mm, after 30 minutes: 35 mm (all dry foam) | Clear solution, Initial foam height 35-40 mm, After 5 minutes, 20 mm, after 30 minutes: 5 mm | Clear solution, Initial foam height 35-10 mm, After 5 minutes: 7 mm, after 15 minutes: disappear | Clear solution, Initial foam height 17 mm, After 5 minutes: 9 mm, after 10 minutes: 7 mm, after 15 minutes: 5 mmm. | Cloudy solution, no foam |

Example 4

Cationic polyethylene imine derivatives, for examples BASF Sokalan® HP20, and Nalco VX-10035, were added into ethanol/water foaming solutions to boost the foaming performance, as shown in Table 4. DPB-C22 alone could produce stable but not as rich foams comparable with the inline formula using a PEG 10 dimethicone silicone surfactant. With adjusting the pH and adding Sokalan HP20 and VX-10035, it made the foam smaller and smoother, much similar to inline formula.

TABLE 4

| Inline Formula | Formula without PEI | Formula with PEI ethoxylate | Formula with PEI propoxylate |
|---|---|---|---|
| Ethanol SDA 40B 190 Proof, 73.0% | Ethanol SDA 40B 190 Proof, 73.0% | Ethanol SDA 40B 190 Proof, 73.0% | Ethanol SDA 40B 190 Proof, 73.0% |
| Farnesol, 0.25% | DPB-C22, 3.5% | DPB-C22, 1.46% | DPB-C22, 1.46% |
| Bisabolol, 0.1% | USP Water, 23.5% | USP Water, 24.7% | USP Water, 24.7% |
| Ethylhexylgycerin, 0.3% | | Citritc Acid 50%, 0.44% | Citritc Acid 50%, 0.44% |
| PEG 10 Dimethicone, 3.5% | | HP20, 0.44% | VX10035, 0.44% |
| USP water, 22.9% | | | |

Example 5

In this example, a high level of PEI ethoxylate is used in combination with a low level of foaming agent to adequately foam 70% ethanol solutions. These results are shown in FIG. 1.

What is claimed:

1. A foaming alcohol/water composition, comprising an alkoxylated water insoluble structured siloxane having the following formula:

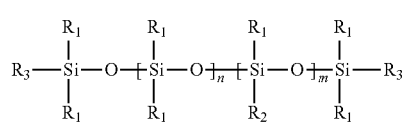

n is 0-30,
m is 1-50,
n+m is 50-80,
$R_1$, and $R_2$, are methyl,
$R_3$ is $(AO)xY$, where AO is propylene oxide or butylene oxide; x is 1-100 and Y is H or alkyl or a polymer of one or more of polypropylene glycol (PO) or polybutylene glycol (BO);

water; and alcohol, wherein said alcohol is present in an amount of greater than 50 wt. % of said composition.

2. The foaming alcohol/water composition of claim 1, wherein the polymer has about 1 to about 75 moles PO or BO.

3. The foaming alcohol/water composition of claim 1, wherein the polymer has about 5 to about 50 moles PO or BO.

4. The foaming alcohol/water composition of claim 1, wherein the structured siloxane has a total molecular weight of from about 1,500 to about 6,000.

5. The foaming alcohol/water composition of claim 1, wherein the structured siloxane has a total molecular weight of from about 2,000 to about 5,500.

6. The foaming alcohol/water composition of claim 1, further comprising polypropylene glycol homopolymers, propoxylated esters, ethoxylated alkane alcohols, ethoxylated alkyne alcohols, and/or alkanes.

7. The foaming alcohol/water composition of claim 1, wherein the foaming alcohol/water composition is substantially free of silicone surfactants.

8. The foaming alcohol-/water composition of claim 1 wherein said alcohol is a C1 to C6 alcohol.

9. A cleaning composition comprising the foaming alcohol/water composition of claim 1.

10. The cleaning composition of claim 9 further comprising: surfactants, builders, chelating agents, dye transfer inhibiting agents, viscosity modifiers, dispersants, enzymes, enzyme stabilizers, catalytic materials, bleaches, bleach activators, hydrogen peroxide, sources of hydrogen peroxide, preformed peracids, polymeric dispersing agents, threshold inhibitors, pigments, clay soil removal/anti-redeposition agents, brighteners, suds suppressors, dyes, fabric hueing agents, perfumes, structure elasticizing agents, fabric softeners, carriers, hydrotropes, processing aids, solvents, antimicrobials, pH buffers, active fluorescent whitening ingredient, or mixtures thereof.

11. A method of cleaning, comprising: applying the cleaning composition of claim 9 to a hard surface or a soft surface.

12. The method of claim 11, further comprising rinsing or wiping said surface so that soils are removed.

13. The foaming alcohol/water composition of claim 1, further comprising a positively charged polyethyleneimine polymer.

14. The foaming alcohol/water composition of claim 13, wherein the polyethyleneimine polymer is alkoxylated.

15. The foaming alcohol/water composition of claim 13, wherein the polyethyleneimine polymer is ethoxylated.

16. A liquid skin sanitizing composition comprising:
an alkoxylated water insoluble structured siloxane having the following formula:

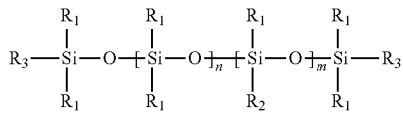

n is 0-30,
m is 1-50,
n+m is 50-80,
$R_1$, $R_2$, and $R_3$ are methyl, except
one or both of $R_2$ and $R_3$ are $(AO)xY$,
where AO is propylene oxide or butylene oxide; x is 1-100 and Y is H or alkyl or a polymer of one or more of polypropylene glycol (PO) or polybutylene glycol (BO);
a linear or branched C1 to C6 alcohol in an amount of from about 50 wt. % to about 90 wt. % of said composition;
water;
one or more skin conditioners of no more than about 3 wt. % of said composition;
a high spreading emollient; and
a medium spreading emollient.

17. The liquid skin sanitizing compositions of claim 16, wherein the ratio of high spreading emollient to medium spreading emollient is about 3:1 to about 1:3.

18. The liquid skin sanitizing composition of claim 16, wherein said medium spreading emollient includes one or more of: capric/caprylic triglyceride, C12-15 alkyl benzoate, capric triglyceride, caprylic triglyceride, isopropyl myristrate, isopropyl palmitate, octyldodecanol, decyl oleate, cocoglycerides, ethylhexyl stearate, cetearyl isononanoate, cetearyl ethyhexanonate, decyl cocoate, cetyl dimethicone, ethylhexyl palmitate, PPG-11 stearyl ether, PPG-15 stearyl ether, 10-20 centistoke Dimethicone fluid, or PPG-14 butyl ether.

19. The liquid skin sanitizing composition of claim 16, wherein said high spreading emollient includes one or more of dicaprylyl carbonate, dibutyl adipate, hexyl laurate, dicaprylyl ether, propylheptyl caprylate, 4-10 centistoke silicone oil, D4, 5, or 6 cyclic siloxane, isocetyl palmitate, hydrogenated polyisobutene, or diethylhexylcarbonate.

20. The liquid skin sanitizing composition of claim 16, wherein said structured siloxane is present in an amount from about 0.5 wt. % to about 10 wt. %.

21. The liquid skin sanitizing composition of claim 16, wherein said structured siloxane is present in an amount from about 1 wt. % to about 7 wt. %.

22. The liquid skin sanitizing composition of claim 16, wherein said structured siloxane is present in an amount from about 2 wt. % to about 5 wt. %.

23. The liquid skin sanitizing composition of claim 16, wherein said one or more skin conditioners is one or more of the following: alkyl benzoate, myristyl myristate, cetyl myristate, gelatin, carboxylic acid, glyceryl dioleate, methyl laurate, PPG-9 laurate, lauryl lactylate, allantoin, octyl palmitate, lanolin, propylene glycol, butylene glycol, ethylene glycol, caprylyl glycol, monobutyl ether, glycerine, fatty acids, praline, almond oil, mineral oil, canola oil, sesame oil, soybean oil, pyrrolidine oil, wheat germ oil, hydrolyzed wheat protein, hydrolyzed oat protein, hydrolyzed collagen, corn oil, peanut oil, olive oil, isopropyl myristate, myristyl alcohol, aloe vera, algae extract, gluconic acid, hydrolyzed silk protein, 1,3-propane diol, Vitamin E, nicotinamide, stearyl alcohol, isopropyl palmitate, sorbitol, amino acid complexes, panthenol, Dihydroxypropyltrimonium Chloride, quaternized hydrolyzed collagen protein, quaternized hydrolyzed oat protein, quaternized hydrolyzed wheat protein, inositol, fructose, sucrose, hydrolyzed plant proteins, seaweed extract, polyethylene glycol, ammonium lactate, sodium hyaluronate, betaine, cyclic peptides, hydroxyethyl urea, agarose, urea, sodium PCA, arginine PCA, fructose, glucose, glutamic acid, honey, lactose, maltose, petrolatum, shea butter, avocado oil, balm mint oil, cod liver oil, mineral oil, trimyristin, stearyl stearate, synthetic wax, ethyl hexylglycerin, cholesterol, cystine, hyaluronic acid, keratin, lecithin, egg yolk, glycine, PPG-12, polyquaternium-11, behentrimonium chloride, dihydroxypropyl PEG-5 linoleammonium chloride, glycerol oleate, PEG-7 glyceryl cocoate, cocoglucoside, PEG-200 hydrogenated glyceryl palmate, retinal, salicylic acid, vegetable oil, methyl gluceth-10, methyl gluceth-20, ethoxylated derivatives of glycereth-26, ethoxylated shea butter, bisabolol, or mixtures thereof.

24. The liquid skin sanitizing composition of claim 16, wherein said composition is in the form of a water thin liquid, a gel, an emulsion, or an aerosol foam.

25. A method of sanitizing skin comprising:
applying the liquid skin sanitizing composition of claim 16 to a skin surface; and thereafter allowing said liquid skin sanitizing composition to dry.

26. The method of claim 25 wherein said steps of applying and drying are repeated from about 20 to 100 times a day.

* * * * *